United States Patent
Kojima et al.

(10) Patent No.: US 7,149,711 B2
(45) Date of Patent: Dec. 12, 2006

(54) APPARATUS FOR ISSUING COMMODITY CODES FOR COMMODITY MODEL NAMES

(75) Inventors: Koichi Kojima, Tokyo (JP); Masaya Abe, Kanagawa (JP); Masayuki Ohta, Kanagawa (JP); Yukio Hasegawa, Kanagawa (JP); Masaomi Kuraoka, Tokyo (JP); Yasuo Wakabayashi, Kanagawa (JP); Atsushi Tomita, Kanagawa (JP); Tatsuya Kori, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 747 days.

(21) Appl. No.: 10/133,918

(22) Filed: Apr. 25, 2002

(65) Prior Publication Data

US 2002/0169693 A1    Nov. 14, 2002

(30) Foreign Application Priority Data

Apr. 25, 2001   (JP)   ............................. 2001-127765
Apr. 17, 2002   (JP)   ............................. 2002-115096

(51) Int. Cl.
  G06Q 30/00   (2006.01)
  G06F 7/00    (2006.01)
  G06F 17/30   (2006.01)
(52) U.S. Cl. .......................................... 705/26; 707/10
(58) Field of Classification Search ................. 705/26, 705/27; 707/3, 102, 62, 10; 709/203
See application file for complete search history.

(56) References Cited

U.S. PATENT DOCUMENTS 5,630,125 A * 5/1997 Zellweger ............... 707/103 R
6,323,894 B1 * 11/2001 Katz ....................... 348/14.08
6,418,441 B1 * 7/2002 Call ........................... 707/10
6,519,588 B1 * 2/2003 Leschner ...................... 707/3
2002/0075145 A1 * 6/2002 Hardman et al. ........... 340/442
2002/0120545 A1 * 8/2002 Katz ........................... 705/37

FOREIGN PATENT DOCUMENTS

JP        5307-579 A    * 11/1993

OTHER PUBLICATIONS

"Mopar VIN Decoder Results"with dates 1966-1974.*
"ebix/com Becomes Exclusive Insurance Provider to Leading Vehicle Warranty Site; ebix Insurance Center Goes Live Today on 1SourceAutoWarranty.com"; Business/Technology Editors; Business Wire; New York; May 24, 2000.*
Dodd, J.A., "F&S Index Plus Text on Compact Disc: Added Value for a Familiar Resource," CD-ROM Professional, vol. 5, No. 6, p. 84, Nov. 1992.*
Freiburger, D., "Big-Block Mopar: Mo' Money to Save, Mo' Power to Burn," Hot Rod, vol. 46, No. 5, p. 38, May, 1993.*

* cited by examiner

Primary Examiner—Nicholas D. Rosen
(74) Attorney, Agent, or Firm—Morgan & Finnegan, LLP

(57) ABSTRACT

An object of the present invention is to provide an apparatus which can manage commodities efficiently by unifying and maintaining commodity codes in order for companies to manage commodities. An apparatus according to the present invention manages product names each consisting of multiple levels and model names below them by means of a product family tree management section and issues commodity codes each consisting of multiple levels for model names by means of a commodity code management section.

6 Claims, 56 Drawing Sheets

FIG. 7

TO BE COMPLETED BY APPLICANT — 71

DATE OF APPLICATION:
DEPARTMENT:
APPLICANT NAME:
TEL:
MAILING ADDRESS:
APPROVER NAME:
TEL:
MAILING ADDRESS:

TYPE OF APPLICATION (NEW REGISTRATION/REGISTRATION CHANGES)

| | BEFORE CHANGE 73 | | | AFTER CHANGE (PLEASE SPECIFY BELOW IN CASE OF NEW REGISTRATION) 74 | | |
|---|---|---|---|---|---|---|
| | POSITION (COMMODITY CLASSIFICATION 1) | POSITION (COMMODITY CLASSIFICATION 2) | POSITION (COMMODITY CLASSIFICATION 3) | POSITION (COMMODITY CLASSIFICATION 1) | POSITION (COMMODITY CLASSIFICATION 2) | POSITION (COMMODITY CLASSIFICATION 3) |
| 001 | | | | | | |
| 002 | | | | | | |
| 003 | | | | | | |
| 004 | | | | | | |
| 005 | | | | | | |
| 006 | | | | | | |
| 007 | | | | | | |
| 008 | | | | | | |
| 009 | | | | | | |
| 010 | | | | | | |

[EXAMPLE 1: NEW REGISTRATION OF COMMODITY CLASSIFICATION 3 (ADDED TO THE END)]

| | BEFORE CHANGE | | | AFTER CHANGE (PLEASE SPECIFY IN CASE OF NEW REGISTRATION) | | |
|---|---|---|---|---|---|---|
| | POSITION (COMMODITY CLASSIFICATION 1) | POSITION (COMMODITY CLASSIFICATION 2) | POSITION (COMMODITY CLASSIFICATION 3) | POSITION (COMMODITY CLASSIFICATION 1) | POSITION (COMMODITY CLASSIFICATION 2) | POSITION (COMMODITY CLASSIFICATION 3) |
| 001 | | | | PRINTER | HIGH-SPEED LBP | CONSUMABLES FOR HIGH-SPEED LBP |
| 002 | | | | | | |
| 003 | | | | | | |
| 004 | | | | | | |
| 005 | | | | | | |
| 006 | | | | | | |
| 007 | | | | | | |
| 008 | | | | | | |
| 009 | | | | | | |
| 010 | | | | | | |

FIG. 9

[EXAMPLE 2: NEW REGISTRATION OF COMMODITY CLASSIFICATION 3 (INSERTED-WHEN POSITIOIN IS SPECIFIED)]

| | BEFORE CHANGE | | | AFTER CHANGE (PLEASE SPECIFY IN CASE OF NEW REGISTRATION) | | |
|---|---|---|---|---|---|---|
| | POSITION (COMMODITY CLASSIFICATION 1) | POSITION (COMMODITY CLASSIFICATION 2) | POSITION (COMMODITY CLASSIFICATION 3) | POSITION (COMMODITY CLASSIFICATION 1) | POSITION (COMMODITY CLASSIFICATION 2) | POSITION (COMMODITY CLASSIFICATION 3) |
| 001 | | | | PRINTER | | (MAIN UNIT OF HIGH-SPEED LBP) |
| 002 | | | | | HIGH-SPEED LBP | OPTION FOR HIGH-SPEED LBP |
| 003 | | | | | | (SOFTWARE FOR HIGH-SPEED LBP) |
| 004 | | | | | | |
| 005 | | | | | | |
| 006 | | | | | | |
| 007 | | | | | | |
| 008 | | | | | | |
| 009 | | | | | | |
| 010 | | | | | | |

FIG. 10

[EXAMPLE 3: REGISTRATION OF CHANGES TO COMMODITY CLASSIFICATION 3 (WHEN TAXONOMIC NAME IS CHANGED AND WHEN POSITION IS CHANGED)]

| | BEFORE CHANGE | | | AFTER CHANGE (PLEASE SPECIFY IN CASE OF NEW REGISTRATION) | | |
|---|---|---|---|---|---|---|
| | POSITION (COMMODITY CLASSIFICATION 1) | POSITION (COMMODITY CLASSIFICATION 2) | POSITION (COMMODITY CLASSIFICATION 3) | POSITION (COMMODITY CLASSIFICATION 1) | POSITION (COMMODITY CLASSIFICATION 2) | POSITION (COMMODITY CLASSIFICATION 3) |
| 001 | PRINTER | HIGH-SPEED LBP | (MAIN UNIT OF HIGH-SPEED LBP) | PRINTER | HIGH-SPEED LBP | (MAIN UNIT OF HIGH-SPEED LBP) |
| 002 | | | OPTION FOR HIGH-SPEED LBP | | | ACCESSORY FOR HIGH-SPEED LBP |
| 003 | | | (SOFTWARE FOR HIGH-SPEED LBP) | | | (SOFTWARE FOR HIGH-SPEED LBP) |
| 004 | | | | | | |
| 005 | PRINTER | HIGH-SPEED LBP | (MAIN UNIT OF HIGH-SPEED LBP) | PRINTER | HIGH-SPEED LBP | (SOFTWARE FOR HIGH-SPEED LBP) |
| 006 | | | OPTION FOR HIGH-SPEED LBP | | | OPTION FOR HIGH-SPEED LBP |
| 007 | | | (SOFTWARE FOR HIGH-SPEED LBP) | | | (CONSUMABLES FOR HIGH-SPEED LBP) |
| 008 | | | | | | |
| 009 | | | | | | |
| 010 | | | | | | |

FIG. 15

EDIT PRODUCT TREE (NEW)

CLASSIFICATION LEVEL: COMMODITY CLASSIFICATION 3 ▶

PARENT COMMODITY CLASSIFICATION: 01047 ▶

| | |
|---|---|
| JAPANESE NAME | PLAIN PAPER |
| ENGLISH NAME | PLAIN PAPER |
| JAPANESE NAME | RECYCLED PLAIN PAPER |
| ENGLISH NAME | RECYCLED PLAIN PAPER |
| DISPLAY ORDER (WITHIN PARENT CLASSIFICATION) | ADD TO THE END ▶ |

PLAIN PAPER
RECYCLED PLAIN PAPER
COLOR PAPER
ADD TO THE END

— 151

RESET    REGISTER — 152

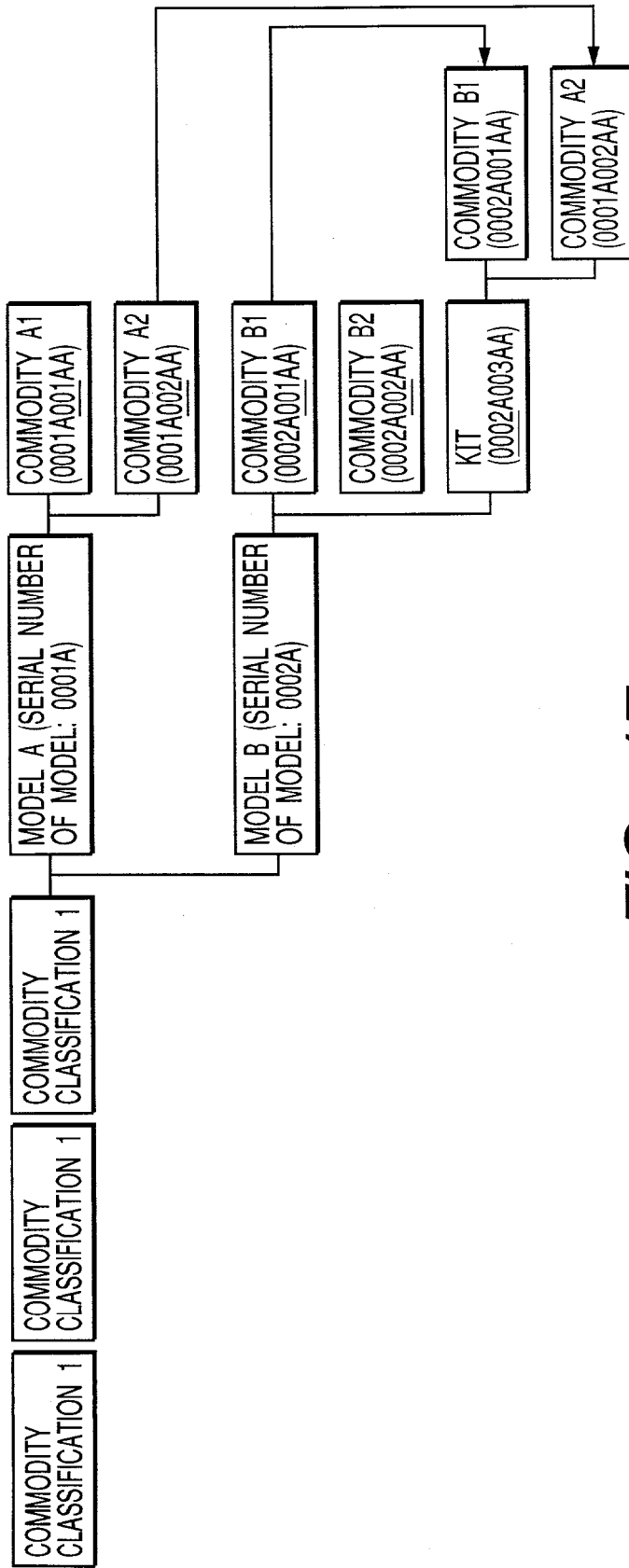

FIG. 18

| REASONS FOR COMMODITY CODE ISSUANCE OR CHANGES | | FIRST LEVEL | | SECOND LEVEL | THIRD LEVEL |
|---|---|---|---|---|---|
| | | MODEL | COMMODITY SPECIFICATIONS | | |
| DIFFERENCES IN MODELS | DIFFERENCES AT THE LEVEL OF SERIES, DEVELOPMENT NAMES, ETC. | ○ | | | |
| DIFFERENCES IN PRODUCTS | DIFFERENCES IN CATALOG PERFORMANCE<br>DIFFERENCES IN INSTALLED SOFTWARE<br>DIFFERENCES IN POWER OR VOLTAGE<br>DIFFERENCES IN EXTERIOR DESIGN<br>DIFFERENCES IN NAME | | ○ | | |
| DIFFERENCES IN COMMODITIES | DIFFERENCES IN COMBINATION OF BUNDLED PRODUCTS<br>DIFFERENCES IN THE NUMBER OF BUNDLED PRODUCTS<br>DIFFERENCES IN INCLUDED PRINTED MATTER OR LANGUAGE | | ○ | | |
| DIFFERENCES IN MANAGEMENT | DIFFERENCES IN COUNTRY OF ORIGIN<br>DIFFERENCES IN ACQUIRED STANDARDS<br>(E.G., SUPPORT FOR CE MARK)<br>DIFFERENCES IN SOFTWARE VERSIONS<br>(E.G., MAINLY CLBP, CONTROLLERS)<br>CHANGES OR ADDITIONS OF IMPORTANT COMPOMENTS<br>(E.G., CHANGES TO CCD) | | | ○ | |
| | LOCAL MANAGEMENT AT EACH BASE<br>(MAY BE USED TO ACCOMMODATE DIFFERENCES IN<br>DOMESTIC PRODUCTION PLANTS, COST CHANGES,<br>CHANGES IN BUNDLED PRODUCTS, AND INCORPORATION<br>OF LOT NUMBERS, ETC.) | | | | ○ |

FIG. 19

| PRODUCT CATEGORY | FIRST LEVEL | SECOND LEVEL | THIRD LEVEL | TREE |
|---|---|---|---|---|
| JOB-ORDER PRODUCT | TO BE CONVENIENT FOR CUSTOMERS TO RECOGNIZE COMMODITIES (SERIAL NUMBER) | TO BE CLASSIFIED BY SHIPMENT BASED ON RECEIVED ORDER OR TO BE CAPABLE OF IDENTIFYING SPECIFICATIONS (SERIAL NUMBER) | N/A | YES |
| SALES PROMOTION MATERIAL, EXCEPTIONAL GOODS | TO BE CONVENIENT FOR CUSTOMERS TO RECOGNIZE COMMODITIES (SERIAL NUMBER) | N/A | N/A | NO |
| NAME-BRAND SUPPLIER PRODUCT | TO BE CONVENIENT FOR CUSTOMERS TO RECOGNIZE COMMODITIES (SERIAL NUMBER) | TO BE CAPABLE OF IDENTIFYING VERSIONS, ETC. (SERIAL NUMBER) | N/A | YES |
| COMPONENT MATERIAL FOR SALES COMPANIES | TO BE CONVENIENT FOR CUSTOMERS TO RECOGNIZE COMMODITIES (SERIAL NUMBER) | TO BE CLASSIFIED BY SHIPMENT BASED ON RECEIVED ORDER (SERIAL NUMBER) | N/A | NO |
| NET PRODUCT, INTANGIBLE PRODUCT | TO BE CONVENIENT FOR CUSTOMERS TO RECOGNIZE COMMODITIES (SERIAL NUMBER) | TO BE CAPABLE OF IDENTIFYING SOFTWARE VERSIONS, ETC. | N/A | YES |

FIG. 20

| | FIRST LEVEL | | | | | | | | SECOND LEVEL | | THIRD LEVEL | |
|---|---|---|---|---|---|---|---|---|---|---|---|---|
| | 1 | 2 | 3 | 4 | 5 | 6 | 7 | 8 | 9 | 10 | 11 | 12 |
| | N | N | N | N | A | X | X | X | A | A | X | X |

| | 1 | 2 | 3 | 4 | 5 | 6 | 7 | 8 | 9 | 10 | 11 | 12 |
|---|---|---|---|---|---|---|---|---|---|---|---|---|
| INITIAL NUMBERING | 0 | 0 | 0 | 1 | A | 0 | 0 | 1 | A | A | | |
| MODEL PORTION IN FIRST LEVEL | 9 | 9 | 9 | 9 | A | 0 | 0 | 1 | A | A | | |
| | 0 | 0 | 0 | 1 | B | 0 | 0 | 1 | A | A | | |
| SPECIFICATION PORTION IN FIRST LEVEL | 0 | 0 | 0 | 1 | A | 9 | 9 | 9 | A | A | | |
| | 0 | 0 | 0 | 1 | A | A | 0 | 1 | A | A | | |
| SECOND LEVEL | 0 | 0 | 0 | 1 | A | 0 | 0 | 1 | A | A | | |
| | 0 | 0 | 0 | 1 | A | 0 | 0 | 1 | A | B | | |
| | 0 | 0 | 0 | 1 | A | 0 | 0 | 1 | B | A | | |
| THIRD LEVEL | 0 | 0 | 0 | 1 | A | 0 | 0 | 1 | A | A | | |
| | 0 | 0 | 0 | 1 | A | 0 | 0 | 1 | A | A | 0 | 1 |
| | 0 | 0 | 0 | 1 | A | 0 | 0 | 1 | A | A | 0 | 2 |
| | 0 | 0 | 0 | 1 | A | 0 | 0 | 1 | A | A | 0 | 3 |

FIG. 21

| FIRST LEVEL | | | | | | | | SECOND LEVEL | | THIRD LEVEL | |
|---|---|---|---|---|---|---|---|---|---|---|---|
| 1 | 2 | 3 | 4 | 5 | 6 | 7 | 8 | 9 | 10 | 11 | 12 |
| N | N | N | N | A | N | N | N | (N) | (N) | SPACE | |

| | | | | | | | | |
|---|---|---|---|---|---|---|---|---|
| FIRST LEVEL | 0 | 0 | 0 | 0 | H | 0 | 0 | 1 |
| | 0 | 0 | 0 | 0 | H | 9 | 9 | 9 |
| | 0 | 0 | 0 | 1 | H | 0 | 0 | 0 |

| | | | | | | | | | | |
|---|---|---|---|---|---|---|---|---|---|---|
| SECOND LEVEL | 0 | 0 | 0 | 1 | H | 0 | 0 | 1 | 0 | 1 |
| | 0 | 0 | 0 | 1 | H | 0 | 0 | 1 | 0 | 2 |

FIG. 22

| FIRST LEVEL | | | | | | | | SECOND LEVEL | | THIRD LEVEL | |
|---|---|---|---|---|---|---|---|---|---|---|---|
| 1 | 2 | 3 | 4 | 5 | 6 | 7 | 8 | 9 | 10 | 11 | 12 |
| N | N | N | (N) | A | N | N | N | SPACE | | | |

| | | | | | | | | |
|---|---|---|---|---|---|---|---|---|
| FIRST LEVEL | 0 | 0 | 0 | 0 | S | 0 | 0 | 1 |
| | 0 | 0 | 0 | 0 | S | 9 | 9 | 9 |
| | 0 | 0 | 0 | 1 | S | 0 | 0 | 0 |
| | 0 | 0 | 0 | Z | S | 0 | 0 | 1 |

FIG. 35

| NUMBERING MAIN |
| FILE (F) EDIT (E) VIEW (V) FAVORITES (A) TOOLS (T) HELP (H) |

NUMBERING MAIN

WXLAA001
WAMERCURY1
2001/04/18 14:42
2001/04/18 14:33 [JST]

| MASS-PRODUCED | SALES PROMOTION | JOB-ORDER | PRODUCTION MATERIAL | FOR SALES COMPANY | NET PRODUCT |

SPECIFY SEARCH CRITERIA

DATA STATUS
COMMODITY CODE
DISPLAY NAME

PRODUCTS BUSINESS UNIT
MANAGERIAL COMMODITY NAME
MODEL NAME

RELEASE STATUS
KIT INCLUDE KIT

SEARCH

COMMODITY TO BE NUMBERED WITHIN 24 HOURS
REFRESH THE SCREEN IF A PRODUCT CODE WAS ISSUED OR EDITED.

COMMODITY FAMILY TREE+MODELS
TEST ITEM CLASSIFICATION 1
 TEST ITEM CLASSIFICATION 2AAA
  TEST ITEM CLASSIFICATION 3XXX
   MODEL A
   MODEL B
   MODEL C
   MODEL D
   MODEL E
   MODEL F
   MODEL G
   MODEL H
   MODEL I
   MODEL J
   MODEL K
   MODEL L
   MODEL M
   MODEL N
   MODEL O
   MODEL P
   MODEL Q
   MODEL R

CIPCOM  LOGOUT

REFRESH  MENU  HELP

INTERNET

| NUMBERING MAIN | | | | | | | | | | | | |
|---|---|---|---|---|---|---|---|---|---|---|---|---|
| FILE (F) EDIT (E) VIEW (V) FAVORITES (A) TOOLS (T) HELP (H) | | | | | | | | | | | | |

NUMBERING MAIN  2001/04/18 14:42
WXLAA001  2001/04/18 14:33 [JST]
WAMERCURY1

| MASS-PRODUCED | SALES PROMOTION | JOB-ORDER | PRODUCTION MATERIAL | FOR SALES COMPANY | NET PRODUCT |
|---|---|---|---|---|---|

SPECIFY SEARCH CRITERIA
DATA STATUS [ ▼ ]   PRODUCTS BUSINESS UNIT [ ]   RELEASE STATUS [ ▼ ]   COMMODITY TO BE NUMBERED WITHIN 24 HOURS ☐
COMMODITY CODE [7079A]   MANAGERIAL COMMODITY NAME [ ]   KIT [INCLUDE KIT ▼]
DISPLAY NAME [ ]   MODEL NAME [ ]   [SEARCH]   REFRESH THE SCREEN IF A PRODUCT CODE WAS ISSUED OR EDITED.

TO COMMODITY CLASSIFICATION TREE                                    HITDATA: 5

| NO | COMMODITY CLASS. 1 | COMMODITY CLASS. 2 | COMMODITY CLASS. 3 | MODEL CODE | MODEL NAME | STATUS | COMMODITY CODE | NEW CODE | KIT | MAIN COMPONENT | DISPLAY NAME | MANAGERIAL NAME | ORIGIN |
|---|---|---|---|---|---|---|---|---|---|---|---|---|---|
| 1 | TEST ITEM CLASS. 1 | TEST ITEM CLASS. 2AAA | TEST ITEM CLASS. 3XXX | ○7079A | MODEL A | -- | ○7079A001AA | 7079A001AA | N | ○ | TEST ITEM A-1 | TEST ITEM A-1 | JP |
| 2 | TEST ITEM CLASS. 1 | TEST ITEM CLASS. 2AAA | TEST ITEM CLASS. 3XXX | ○7079A | MODEL A | -- | ○7079A002AA | 7079A002AA | N | ○ | TEST ITEM A-2 | TEST ITEM A-2 | JP |
| 3 | TEST ITEM CLASS. 1 | TEST ITEM CLASS. 2AAA | TEST ITEM CLASS. 3XXX | ○7079A | MODEL A | -- | ○7079A002AB | 7079A002AB | N | ○ | TEST ITEM A-2 | TEST ITEM A-2 | JP |
| 4 | TEST ITEM CLASS. 1 | TEST ITEM CLASS. 2AAA | TEST ITEM CLASS. 3XXX | ○7079A | MODEL A | -- | ○7079A002BB | 7079A002BB | N | ○ | TEST ITEM A-2 | TEST ITEM A-2 | CN |
| 5 | TEST ITEM CLASS. 1 | TEST ITEM CLASS. 2AAA | TEST ITEM CLASS. 3XXX | ○7079A | MODEL A | -- | ○7079A002BC | 7079A002BC | N | ○ | TEST ITEM A-2 | TEST ITEM A-2 | CN |

TO COMMODITY CLASSIFICATION TREE                                    HITDATA: 5

| CIPCOM | | REFRESH | NUMBERING 1 FOR KIT | NUMBERING 1 | NUMBERING 2 | NUMBERING 3 | EDIT | COMMODITY COMPOSITION |
|---|---|---|---|---|---|---|---|---|
| LOGOUT | | | | SCRAP | RELESE TO | PRINT IMAGE | MENU | HELP |

DONE                                                              ○ INTERNET

FIG. 38

COMMODITY REGISTRATION RESULTS

MODEL NAME: MODEL A
COMMODITY CODE: 7079A003AA

| DISPLAY NAME | TEST ITEM A-3 | | |
|---|---|---|---|
| BRAND CATEGORY | CAN BRAND | | |
| JAN/EAN | --------- | UPC | --------- |
| RESALE PRODUCT CATEGORY | N | ORIGINAL CODE OF RESALE PRODUCT | |

| MANAGERIAL NAME | TEST ITEM A-3 |
|---|---|
| ORIGIN COUNTRY | JAPAN |

| COMMODITY NAME | JAPANESE | | ENGLISH | |
|---|---|---|---|---|

| DESCRIPTION OF SECOND LEVEL | JAPANESE | | ENGLISH | |
|---|---|---|---|---|

| LOCAL MANAGERIAL NAME | |
|---|---|

| MAIN COMMODITY CATEGORY | PRODUCTS BUSINESS UNIT | AJ |
|---|---|---|

| DESCRIPTION OF THIRD LEVEL | JAPANESE | | ENGLISH | |
|---|---|---|---|---|

| PRODUCTION PLANT | | SUPERVISORY PLANT CATEGORY | |
|---|---|---|---|
| 99 EXTERNAL PRODUCTION PLANT | | N | |

| COMPANY NAME | C. INC. |
|---|---|
| PRELIMINARY CODE | |
| NO-MIGRATION FLAG | N |
| TRANSMIT DRAFT | N |

NUMBERING     CLOSE

COMMODITY REGISTRATION RESULTS

MODEL NAME: MODEL A
COMMODITY CODE: 7079A003AB

| DISPLAY NAME | TEST ITEM A-3 | | |
|---|---|---|---|
| BRAND CATEGORY | CAN | BRAND | |
| JAN/EAN | | UPC | |
| RESALE PRODUCT CATEGORY | N | ORIGINAL CODE OF RESALE PRODUCT | |

| MANAGERIAL NAME | TEST ITEM A-3 |
|---|---|
| ORIGIN COUNTRY | JAPAN |

| | JAPANESE | ENGLISH |
|---|---|---|
| COMMODITY NAME | | |

| | JAPANESE | ENGLISH |
|---|---|---|
| DESCRIPTION OF SECOND LEVEL | | |

| LOCAL MANAGERIAL NAME | |
|---|---|
| MAIN COMMODITY CATEGORY | PRODUCTS BUSINESS UNIT | AJ |

| | JAPANESE | ENGLISH |
|---|---|---|
| DESCRIPTION OF THIRD LEVEL | | |

| COMPANY NAME | C. INC. |
|---|---|
| PRELIMINARY CODE | |
| NO-MIGRATION FLAG | N |
| TRANSMIT DRAFT | N |

NUMBERING     CLOSE

FIG. 43

COMMODITY REGISTRATION RESULTS

MODEL NAME: MODEL A
COMMODITY CODE: 7079A003BA

| DISPLAY NAME | TEST ITEM A-3 | |
|---|---|---|
| BRAND CATEGORY | CAN BRAND | |
| JAN/EAN | | UPC |
| RESALE PRODUCT CATEGORY | N | ORIGINAL CODE OF RESALE PRODUCT |

| MANAGERIAL NAME | TEST ITEM A-3 |
|---|---|
| ORIGIN COUNTRY | GERMANY |

| | JAPANESE | ENGLISH |
|---|---|---|
| COMMODITY NAME | | |

| | JAPANESE | ENGLISH |
|---|---|---|
| DESCRIPTION OF SECOND LEVEL | | |

| LOCAL MANAGERIAL NAME | |
|---|---|
| MAIN COMMODITY CATEGORY | PRODUCTS BUSINESS UNIT AJ |

| | JAPANESE | ENGLISH |
|---|---|---|
| DESCRIPTION OF THIRD LEVEL | | |

| COMPANY NAME | C. INC. |
|---|---|
| PRELIMINARY CODE | |
| NO-MIGRATION FLAG | N |
| TRANSMIT DRAFT | N |

NUMBERING    CLOSE

NUMBERING

2001/04/18 15:01
ID–
regNumbering3    2001/04/18 14:51 [JST]
WAMERCURY1

THIRD-LEVEL NUMBERING

MODEL NAME: MODEL A
SELECTED COMMODITY CODE: 7079A001AA

| DISPLAY NAME | TEST ITEM A-1 | | |
|---|---|---|---|
| BRAND CATEGORY | CAN BRAND | | |
| JAN/EAN | --- | UPC | --- |
| RESALE PRODUCT CATEGORY N | ORIGINAL CODE OF RESALE PRODUCT | | |

| MANAGERIAL NAME | TEST ITEM A-1 | |
|---|---|---|
| ORIGIN COUNTRY | JAPAN | |
| COMMODITY NAME | JAPANESE | ENGLISH |
| DESCRIPTION OF SECOND LEVEL | JAPANESE | ENGLISH |

LOCAL MANAGERIAL NAME
PRODUCTS BUSINESS UNIT [AJ] [BUSINESS HEADQUARTERS ▼] MAIN COMMODITY CATEGORY [  ▼]

| | JAPANESE | ENGLISH |
|---|---|---|
| PRODUCTION PLANT | | |
| | SUPERVISORY PLANT □ | ADD PRODUCTION PLANT |

DESCRIPTION OF
THIRD LEVEL

COMPANY NAME  C. INC.
TRANSMIT DRAFT □    NO-MIGRATION FLAG  N

[REGISTER] [CLOSE] [HELP]

| NUMBERING |
|---|
| FILE (F) EDIT (E) VIEW (V) FAVORITES (A) TOOLS (T) HELP (H) |

NUMBERING MAIN

| | | WXLAA001 | 2001/04/18 14:42 |
| --- | --- | --- | --- |
| | | WAMERCURY1 | 2001/04/18 14:33 (JST) |

| MASS-PRODUCED | SALES PROMOTION | JOB-ORDER | PRODUCTION MATERIAL | FOR SALES COMPANY | NET PRODUCT |
|---|---|---|---|---|---|

SPECIFY SEARCH CRITERIA
DATA STATUS ▢  PRODUCTS BUSINESS UNIT ▢  RELEASE STATUS ▢  COMMODITY TO BE NUMBERED WITHIN 24 HOURS ☐
COMMODITY CODE ▢  MANAGERIAL COMMODITY NAME ▢  KIT [INCLUDE KIT ▶]
DISPLAY NAME ▢  MODEL NAME ▢  [SEARCH]  REFRESH THE SCREEN IF A PRODUCT CODE WAS ISSUED OR EDITED.

COMMODITY FAMILY TREE+MODELS
 TEST ITEM CLASSIFICATION 1
  TEST ITEM CLASSIFICATION 2AAA
   TEST ITEM CLASSIFICATION 3XXX
    MODEL A
    MODEL B
    MODEL C
    MODEL D
    MODEL E
    MODEL F
    MODEL G
    MODEL H
    MODEL I
    MODEL J
    MODEL K
    MODEL L
    MODEL M
    MODEL N
    MODEL O
    MODEL P
    MODEL Q
    MODEL R
    MODEL S
   TEST ITEM CLASSIFICATION 3YYY

| SELECTED | MODEL CODE | MODEL NAME |
|---|---|---|
| ○ | 7079A | MODEL A |

DETAILED COMMODITY LIST                                           HITDATA: 9

| NO | SE-LECTED | STATUS | COMMODITY CODE | NEW CODE | KIT | MAIN COMPONENT | LIST NAME | MANAGERIAL NAME | ORIGIN |
|---|---|---|---|---|---|---|---|---|---|
| 1 | ○ | -- | 7079A001AA | 7079A001AA | N | ○ | TEST ITEM A-1 | TEST ITEM A-1 | JP |
| 2 | ○ | -- | 7079A001AA01 | 7079A001AA01 | N | ○ | TEST ITEM A-1 | TEST ITEM A-1 | JP |
| 3 | ○ | -- | 7079A002AA | 7079A002AA | N | ○ | TEST ITEM A-2 | TEST ITEM A-2 | JP |
| 4 | ○ | -- | 7079A002AB | 7079A002AB | N | ○ | TEST ITEM A-2 | TEST ITEM A-2 | JP |
| 5 | ○ | -- | 7079A002BB | 7079A002BB | N | ○ | TEST ITEM A-2 | TEST ITEM A-2 | CN |
| 6 | ○ | -- | 7079A002BC | 7079A002BC | N | ○ | TEST ITEM A-2 | TEST ITEM A-2 | CN |

| REFRESH | NUMBERING 1 FOR KIT | NUMBERING 1 | NUMBERING 2 | NUMBERING 3 | EDIT | COMMODITY COMPOSITION |
|---|---|---|---|---|---|---|
| | | SCRAP | RELESE TO | PRINT IMAGE | MENU | HELP |

CIPCOM                                                          ○ INTERNET
LOGOUT
DONE

FIG. 50

SELECT COMPOSITION

COMMODITY COMPOSITION DOCUMENT   ID- DCompMDSE   2001/04/18 15:08
                                    WAMERCURY1   2001/04/18 14:59 [JST]

DOCUMENT NO.
COMMODITY CODE 7079A002AA    REVISION NO. 00
BRAND CATEGORY CAN  BRAND    DISPLAY NAME    TEST ITEM A-2
DATE OF ISSUE                MANAGERIAL NAME TEST ITEM A-2
                             STATUS          DRAFT

APPROVED | CREATED
DATE |
NAME |

DEPARTMENT (JP)
DEPARTMENT (EN)

REVISION RECORD

| REV. DATE | REV. | REVISED BY |
|---|---|---|
| | J | J |
| | E | E |

ADD LINES TO REVISION RECORD | ADD AUTHORIZED VIEWERS

| NAME | COMPOSITION | CONTROL ITEMS | PACKAGE LABELS | DESCRIPTION | LINKED COMMODITIES |

| DISPLAY NAME | TEST ITEM A-2 |
| JAN/EAN | 4960999000008 |
| UPC | |
| MANAGERIAL NAME | TEST ITEM A-2 |
| JAPANESE NAME | TEST ITEM A-2 |
| ENGLISH NAME | TEST ITEM A-2 |
| GERMAN NAME | |
| FRENCH NAME | |
| ITALIAN NAME | |
| SPANISH NAME | |

UPDATE | REQUEST APPROVAL | PRINT IMAGE | EXIT

RELEASE REGISTRATION

RELEASE TO-REGISTRATION

ID-RegRelEtc  2001/04/18 15:39
WAMERCURY1  2001/04/18 15:30 [JST]

| DEL | RELEASE TO | COMPANY NAME | RELEASED BY |
|---|---|---|---|
| ☐ | AAA | C. INC. | C. INC. |
| ☐ | ACM | C. SALES | C. INC. |
| ☐ | | | C. INC. |
| ☐ | | | C. INC. |
| ☐ | | | C. INC. |

ADD COMPANY

SELECT
ACM  C. SALES
ABR  C. USA
ACY  C. CANADA
AAP  C. UK
AAU  C. GERMANY
AAY  C. FRANCE
ABA  C. ITALY

REGION JAPAN ▼ SELECT
AAA  C. INC.
ACC  C APTE
ACE  C SYSTEM
ACH  C SEIKI
ACJ  C CHEMICALS
ACM  C. SALES
ACN  C COPY

UPDATE  CLOSE

APPARATUS FOR ISSUING COMMODITY CODES FOR COMMODITY MODEL NAMES

BACKGROUND OF THE INVENTION

1. Field of the Invention

The present invention relates to an apparatus for issuing commodity codes for commodity model names. More particularly, it relates to an apparatus for issuing commodity codes for commodity model names managed hierarchically.

2. Related Background Art

Conventionally, companies manage commodities and parts (hereinafter referred to simply as commodities) by assigning separate symbols or numerals (hereinafter referred to simply as commodity codes) to individual commodities.

However, a company which has two or more associated companies or a company which has manufacturing bases overseas manages the same commodity with different commodity codes in associated companies or at manufacturing bases.

Consequently, commodities are managed inefficiently and customers are inconvenienced.

SUMMARY OF THE INVENTION

An object of the present invention, which has been made in view of the above problem, is to provide an apparatus which can manage commodities efficiently by unifying and maintaining commodity codes.

Another object of the present invention is to provide an apparatus which can issue unified commodity codes efficiently.

Still another object of the present invention is to provide an apparatus which can reference commodity codes efficiently.

To solve the above problem, a code management apparatus according to the present invention comprises associating means for associating a commodity name with model names placed below the above described commodity name; and numbering means for issuing commodity codes to be assigned to the above described model names, wherein the above described commodity codes each includes multiple levels (hierarchies).

Also, a code management apparatus according to the present invention comprises model display means for displaying a commodity name and a list of model names placed below the commodity name; selection means for selecting one model name from the displayed list; and code display means for displaying a list of commodity codes already issued for the selected model name.

Furthermore, a code management method according to the present invention comprises an associating step of associating a commodity name with model names placed below the above described commodity name; and a numbering step of issuing commodity codes to be assigned to the above described model names, wherein the above described commodity codes each includes multiple levels.

Also, a code management method according to the present invention comprises a model display step of displaying a commodity name and a list of model names placed below the commodity name; a selection step of selecting one model name from the displayed list; and a code display step of displaying a list of commodity codes already issued for the selected model name.

Furthermore, a code management apparatus according to the present invention comprises first permitting means for permitting registration of a commodity classification; commodity classification registration means for registering a commodity classification when permission is given by the above described first permitting means; second permitting means for permitting registration of a commodity name; commodity name registration means for registering a commodity name by placing it in the above described commodity classification; and numbering means for issuing a commodity code for the above described registered commodity name.

Also, a code management method according to the present invention comprises a first permitting step of permitting registration of a commodity classification; a commodity classification registration step of registering a commodity classification when permission is given by the above described first permitting step; a second permitting step of permitting registration of a commodity name; a commodity name registration step of registering a commodity name by placing it in the above described commodity classification; and a numbering step of issuing a commodity code for the above described registered commodity name.

BRIEF DESCRIPTION OF THE DRAWINGS

FIG. 7 is a diagram showing a registration request format for commodity classifications;

FIG. 8 is a diagram showing an entry example of the registration request shown in FIG. 7;

FIG. 9 is a diagram showing an entry example of the registration request shown in FIG. 7;

FIG. 10 is a diagram showing an entry example of the registration request shown in FIG. 7;

FIG. 15 is a diagram showing a window for registering a change;

FIG. 16 is a conceptual diagram showing a relationship between models and commodity code numbering;

FIG. 17 is a conceptual diagram showing a basic system of commodity codes;

FIG. 18 is a diagram showing numbering criteria for mass-produced products;

FIG. 19 is a diagram showing numbering criteria for different commodity categories;

FIG. 20 is a diagram illustrating a numbering method for mass-produced products;

FIG. 21 is a diagram illustrating a numbering method for job-order products and the like;

FIG. 22 is a diagram illustrating a code numbering method for intangible products;

FIG. 35 is a diagram showing a screen displayed during commodity code numbering;

FIG. 36 is a diagram showing a screen displayed during commodity code numbering;

FIG. 37 is a diagram showing a screen displayed during commodity code numbering;

FIG. 38 is a diagram showing a screen displayed during commodity code numbering;

FIG. 39 is a diagram showing a screen displayed during commodity code numbering;

FIG. 40 is a diagram showing a screen displayed during commodity code numbering;

FIG. 41 is a diagram showing a screen displayed during commodity code numbering;

FIG. 42 is a diagram showing a screen displayed during commodity code numbering;

FIG. 43 is a diagram showing a screen displayed during commodity code numbering;

FIG. 44 is a diagram showing a screen displayed during commodity code numbering;

FIG. 45 is a diagram showing a screen displayed during commodity code numbering;

FIG. 46 is a diagram showing a screen displayed during commodity code numbering;

FIG. 47 is a diagram showing a screen displayed during commodity code numbering;

FIG. 48 is a diagram showing a screen displayed when registering a commodity composition document;

FIG. 50 is a diagram showing a screen displayed when registering a commodity composition document;

FIG. 51 is a diagram showing a screen displayed when registering a commodity composition document;

FIG. 52 is a diagram showing a screen displayed when registering a commodity composition document;

FIG. 53 is a diagram showing a screen displayed when registering a commodity composition document;

FIG. 54 is a diagram showing a screen displayed when registering a commodity composition document;

FIG. 56 is a diagram showing a screen displayed when registering a commodity composition document;

FIG. 57 is a diagram showing a screen displayed when registering a commodity composition document;

FIG. 59 is a diagram showing a screen displayed when registering a commodity composition document.

DESCRIPTION OF THE PREFERRED EMBODIMENTS

An embodiment of the present invention will be described in detail below with reference to the drawings.

(Overall System Configuration)

Figure 1:
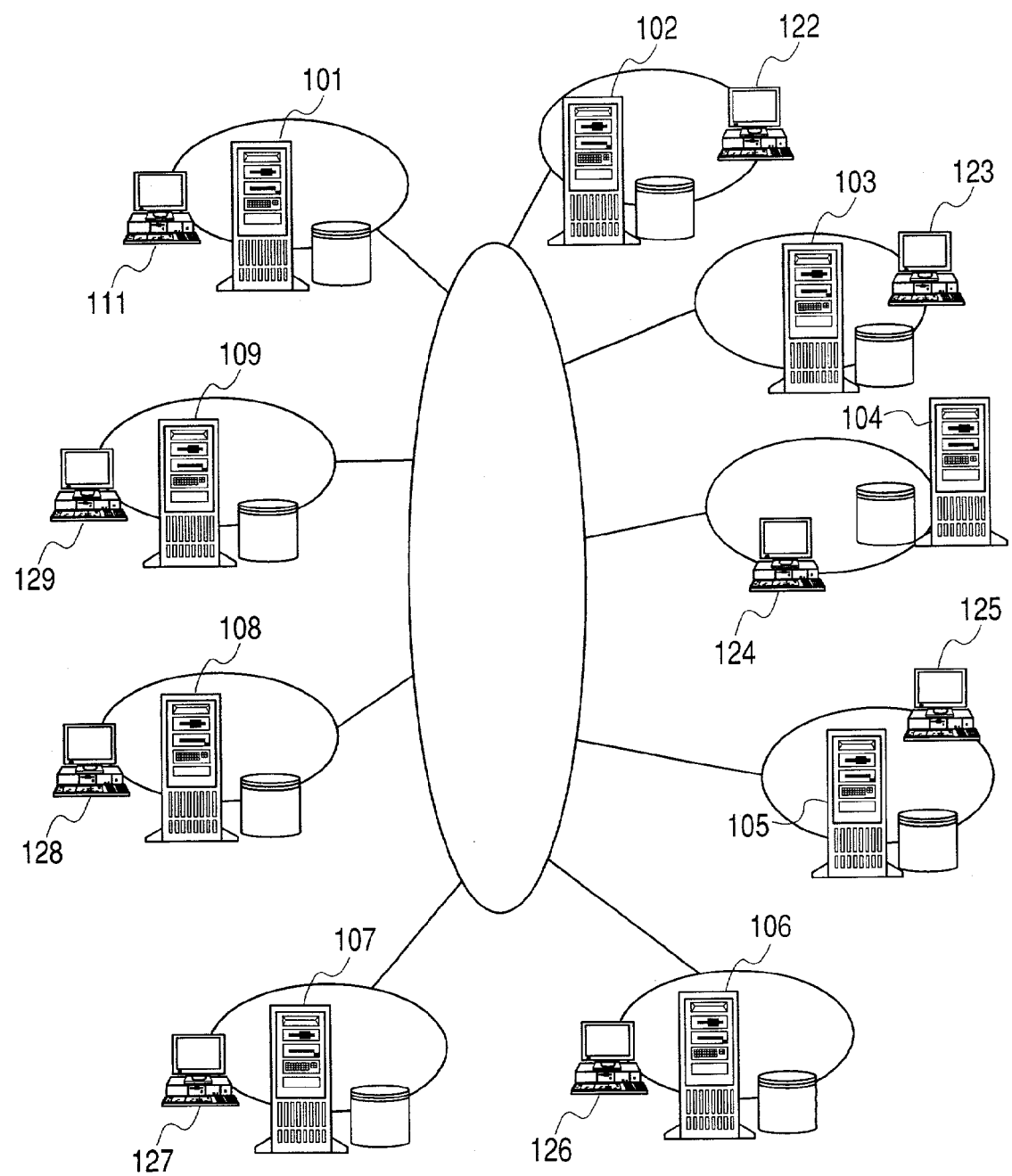
FIG. 1 is a block diagram showing an overall system according to this embodiment.

FIG. 1 is a block diagram showing an overall system according to this embodiment.

In the figure, reference numeral 101 denotes a host system which forms the core of this system. Reference numeral 102 denotes a base system located at a development base where products are developed and designed, reference numeral 103 denotes a base system located at a sales base which takes charge of domestic sales, reference numerals 104 and 105 denote base systems located at domestic or overseas production bases, and reference numerals 106 to 109 denote base systems of domestic or overseas associated companies and the like. Each of the base systems is connected to the host system 101 via a network. Specifically, the term "base" here means a production company, production plant, sales company, or sales office.

The host system 101 is connected with a terminal 111 operated by an administrator who manages and maintains the entire system. The base systems 102 to 109 have respective terminals 122 to 129 which can access other base systems 102 to 109 as well as the host system 101 by means of a browser. Incidentally, although each base is provided with only one terminal in the figure, this is not restrictive.

Each terminal is a typical computer consisting of an input unit, display unit, arithmetic unit, and storage unit. According to this embodiment, it also contains browser software.

Each of the base systems 102 to 109 has its own commodity master (base commodity master: commodity master used by a sales or production system at each base).

Figure 2:
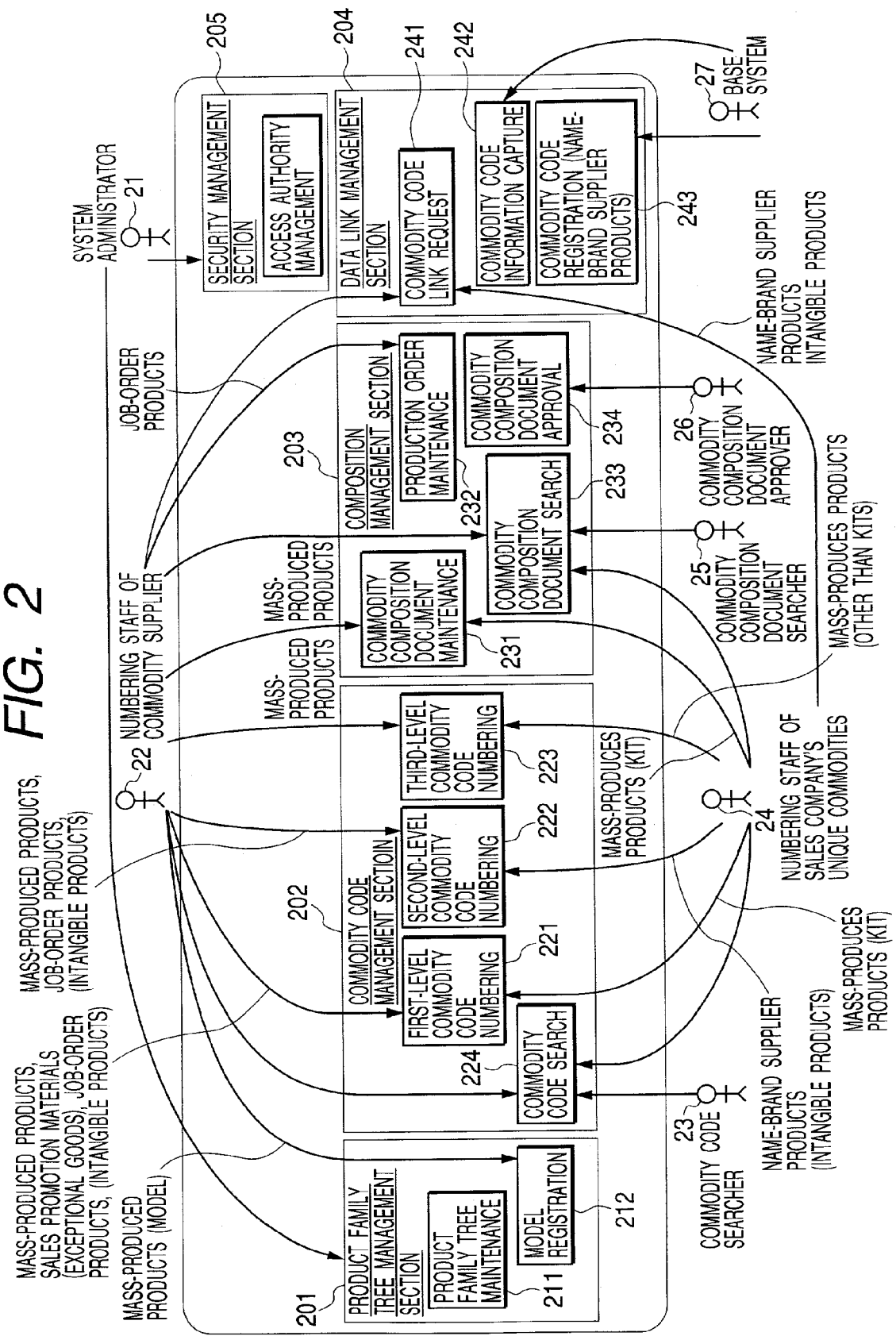
FIG. 2 is a functional block diagram of this system.

FIG. 2 is a functional block diagram of this system. Each function is performed when a program stored in a storage unit is executed by a central processing unit in the host system 101.

As shown in the figure, this system consists of a product family tree management section 201, commodity code management section 202, commodity composition management section 203, data link management section 204, and security management section 205.

The product family tree management section 201, which is a facility for registering, changing, or scrapping product family trees as well as registering models, consists of a product family tree maintenance facility 211 and model registration facility 212.

The commodity code management section 202, which is a facility for issuing commodity codes, managing properties, and searching for commodity codes, consists of a first-level commodity code numbering facility 221, second-level commodity code numbering facility 222, third-level commodity code numbering facility 223, and commodity code search facility 224.

The commodity composition management section 203, which is a facility for registering, changing, approving, searching for, and scrapping commodity composition documents and production orders, consists of a commodity composition document maintenance section 231, production order maintenance section 232, commodity composition document search section 233, and commodity composition document approval section 234.

The data link management section 204, which is a facility for establishing data links with base commodity masters, consists of a commodity code link request section 241, commodity code information capture section 242, and commodity (name-brand supplier product) code registration section 243. The data links here are used for transferring commodity information registered in this system to base systems to ensure consistency between this system and the commodity masters of the base systems.

The security management section 205, which is a facility for managing the access authority of users who access this system, consists of an access authority management section.

Besides, needless to say, a storage section is provided to store information such as commodity codes and product family trees.

As indicated by arrows in the figure, in order to allow an administrator 21 of this system, numbering staff 22 of a commodity supplier, commodity code searcher 23, numbering staff 24 for sales company's unique commodities, commodity composition document searcher 25, commodity composition document approver 26, and operator 27 of the base system for name-brand supplier products or intangible products to access various facilities, the security management section 205 manages their access authority through management of user codes and personal identification numbers.

[Basic Structure of a Commodity Family Tree and Model]

A basic structure of a commodity family tree and model will be described.

Figure 3:
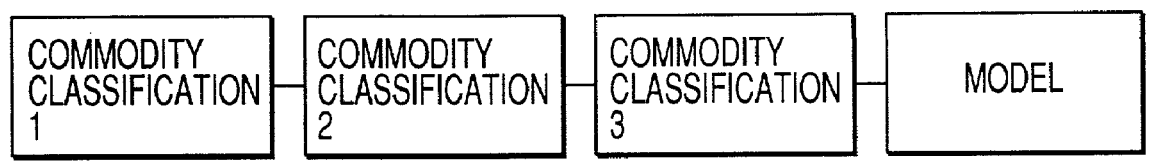
FIG. 3 is a conceptual diagram showing a commodity family tree.

As shown in FIG. 3, a commodity family tree consists of commodity classification 1, commodity classification 2, and commodity classification 3. Models are placed below the commodity family tree. Commodity classification 1, commodity classification 2, commodity classification 3, and a model each have a name consisting of 40 digits. Both English and Japanese names are provided.

The numbers of elements in a commodity family tree satisfy the following relationships: commodity classification 1: commodity classification 2=1: N, and commodity classification 2: commodity classification 3 =1: N, and commodity classification 3: model=1: N, where "1: N" is a ratio of one piece to N pieces.

Five first-level digits (first to fifth digits) of commodity codes are issued at the model level in the above structure. Details of commodity codes will be described later.

[Newly Registering Commodity Family Tree Elements]

New registration of commodity family tree elements will be described.

Figure 4:
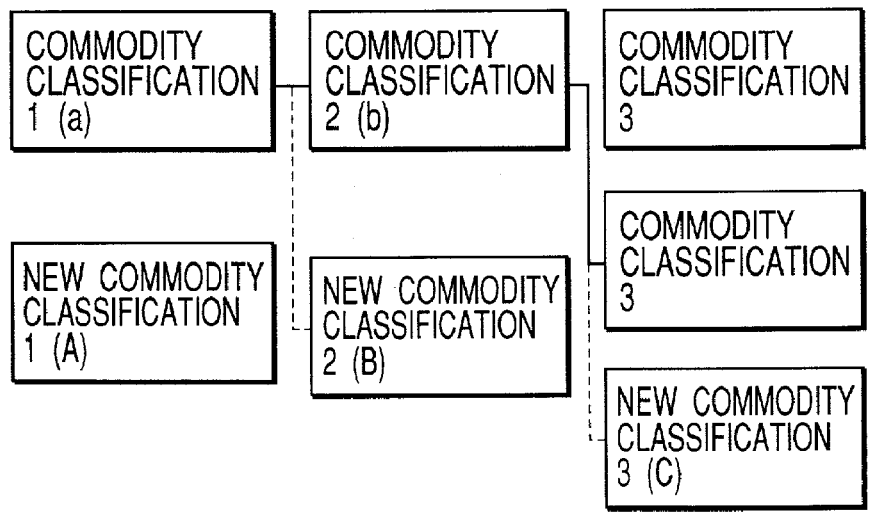
FIG. 4 is a conceptual diagram showing a new registration of product commodity tree elements.

New registrations of commodity classifications 1, 2, and 3 are made by the administrator of this system at the request of a commodity supplier. Specifically, a new registration is made as the administrator of this system enters input from the terminal 111 at the request of a development base, sales base, or the like. As shown in FIG. 4, elements of commodity classifications 2 and 3 can be added below a specified higher level commodity classification. Also, the order in which elements will be displayed can be specified.

The figure shows that: new commodity classification 1(A) has been newly added, new commodity classification 2(B) has been newly added below existing commodity classification 1(a), and new commodity classification 3(C) has been newly added below existing commodity classification 2(b).

[Changing of Commodity Family Tree Elements]

Figure 5:
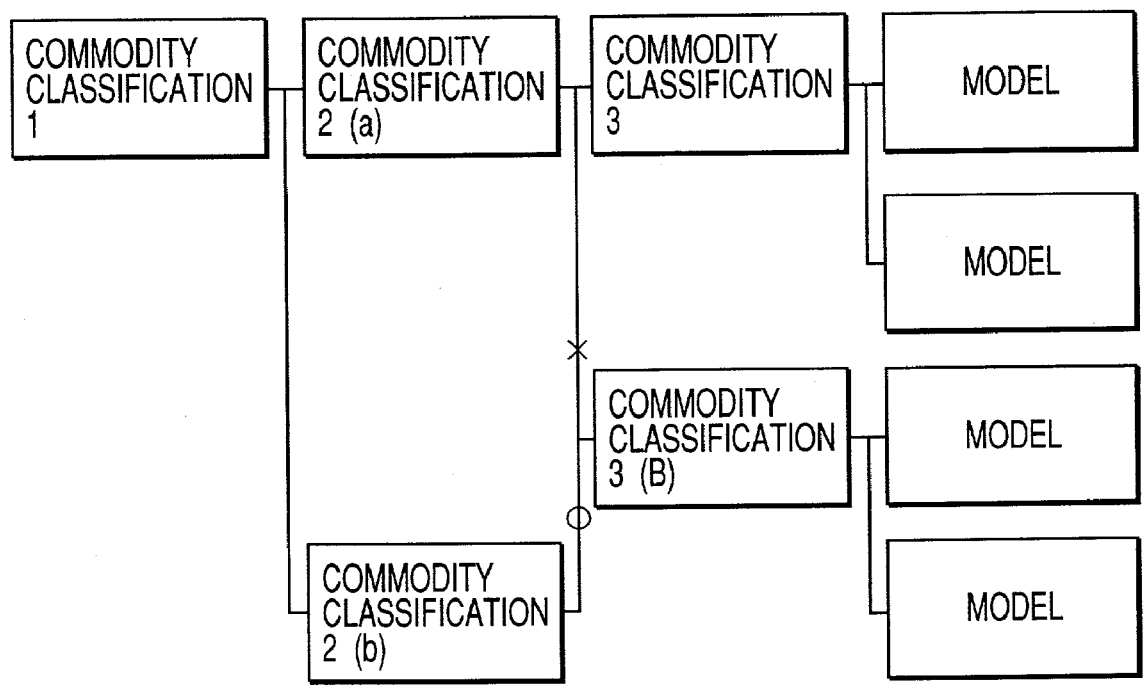
FIG. 5 is a conceptual diagram showing changes to commodity family tree elements.

Changes to commodity classifications 1, 2, and 3 are made by the administrator of this system at the request of a commodity supplier. Also, the display order of elements can be changed within the same level. Also, a tree structure can be changed at a group level (at the level of commodity classification 1, 2, or 3 or models) such as moving all commodities to below another commodity classification. For example, commodity classification 3(B) can be moved from commodity classification 2(a) to commodity classification 2(b) as shown in FIG. 5. Incidentally, the smallest element which can be moved is the model. In any change, five digits at the first-level (first to fifth digits) of the commodity code are issued. Details of commodity codes will be described later.

[Scrapping Commodity Family Tree Elements and Models]

An element can be deleted if no element exists below it. Deletions are performed by the administrator of this system.

[Registering, Changing, or Scrapping Models]

Models are registered by the numbering staff of a sales company. The display order of models linked to the same commodity can be changed, but a model is not divisible. A model can be deleted if no commodity code is linked to it. Changes to the tree above models should be entrusted to the administrator of this system.

[Commodity Family Tree]

Next, a concrete example of a commodity family tree will be described.

Figure 6:
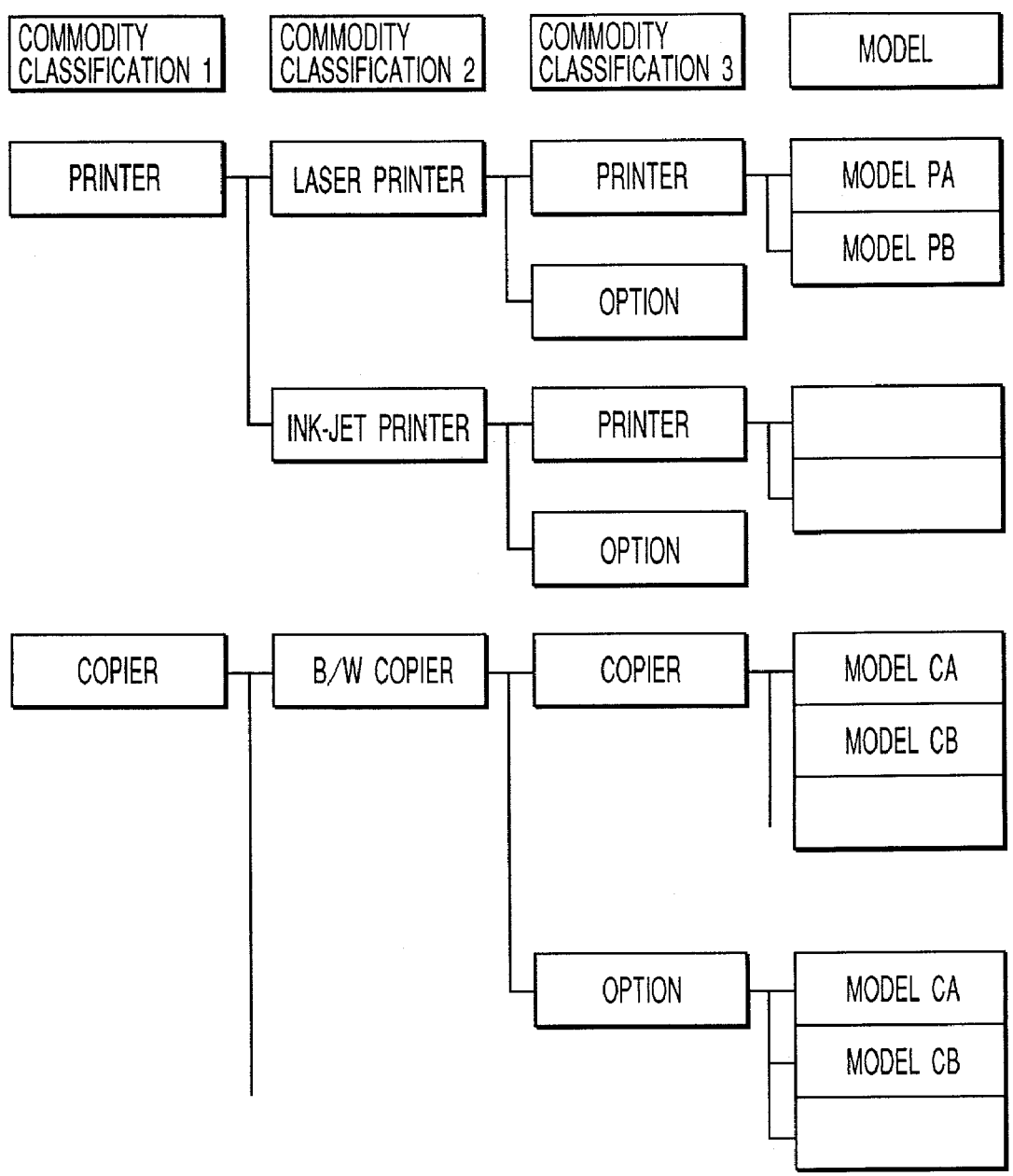
FIG. 6 is a diagram showing a concrete example of a commodity family tree.

As shown in FIG. 6, commodity classification 1 includes Printer, Copier, and Facsimile, for example.

Commodity classification 2, which is located below commodity classification 1, includes, for example, Laser printer and Ink-jet Printer as subcategories of Printer.

Commodity classification 3, which is located below commodity classification 2, includes, for example, Printer and Option as subcategories of Laser Printer.

The model, which is located below commodity classification 3, includes, for example, Model PA and Model PB as subcategories of Printer.

The product family tree, which clarifies a commodity family handled, is a search tree for providing an overall view of the model level which gathers a plurality of commodities together. Commodities for which a commodity family tree can be defined include mass-produced products, job-order products, name-brand supplier products, and intangible products. Such a commodity family tree is created by the registrant of commodity codes. It is revised or scrapped, as required, by the administrator of this system at the request of the issuer of commodity codes.

Now, description will be given about how to apply for registration of a commodity classification.

FIG. 7 shows an application format for registration of a commodity classification. This format can be downloaded by pressing a designated position on the top page of this system. It is filled out and transmitted to apply for registration of a commodity classification.

Based on this request form, relevant departments are consulted, and if registration is considered necessary, the registration is made using the entries of the request form.

In FIG. 7, reference numeral 71 denotes an input area for applicant data. Reference numeral 72 denotes an entry area for application data, which area is divided into an entry area 73 for information before change and an entry area 74 for information after change.

Concrete entry examples will be described with reference to FIGS. 8, 9, and 10.

FIG. 8 shows a case in which a new registration is added to the end of commodity classification 3. Printer has already been registered under commodity classification 1, and High-Speed LBP under commodity classification 2. It is requested to newly register Consumables For High-Speed LBP under a subclassification—commodity classification 3.

FIG. 9 shows a case in which Option For High-Speed LBP is requested to be newly registered between Main Unit Of High-Speed LBP and Software For High-Speed LBP already registered under commodity classification 3.

FIG. 10 shows a case in which a taxonomic name registered under commodity classification 3 is changed from Option For High-Speed LBP to Accessory For High-Speed LBP as well as a case in which Option For High-Speed LBP registered between Main Unit Of High-Speed LBP and Software For High-Speed LBP is requested to be moved to between Software For High-Speed LBP and Consumables For High-Speed LBP.

Next, description will be given about management of commodity classifications carried out by the administrator of this system.

To manage commodity classifications, the administrator can log on to this system and specify Commodity Tree Maintenance.

Figure 11:
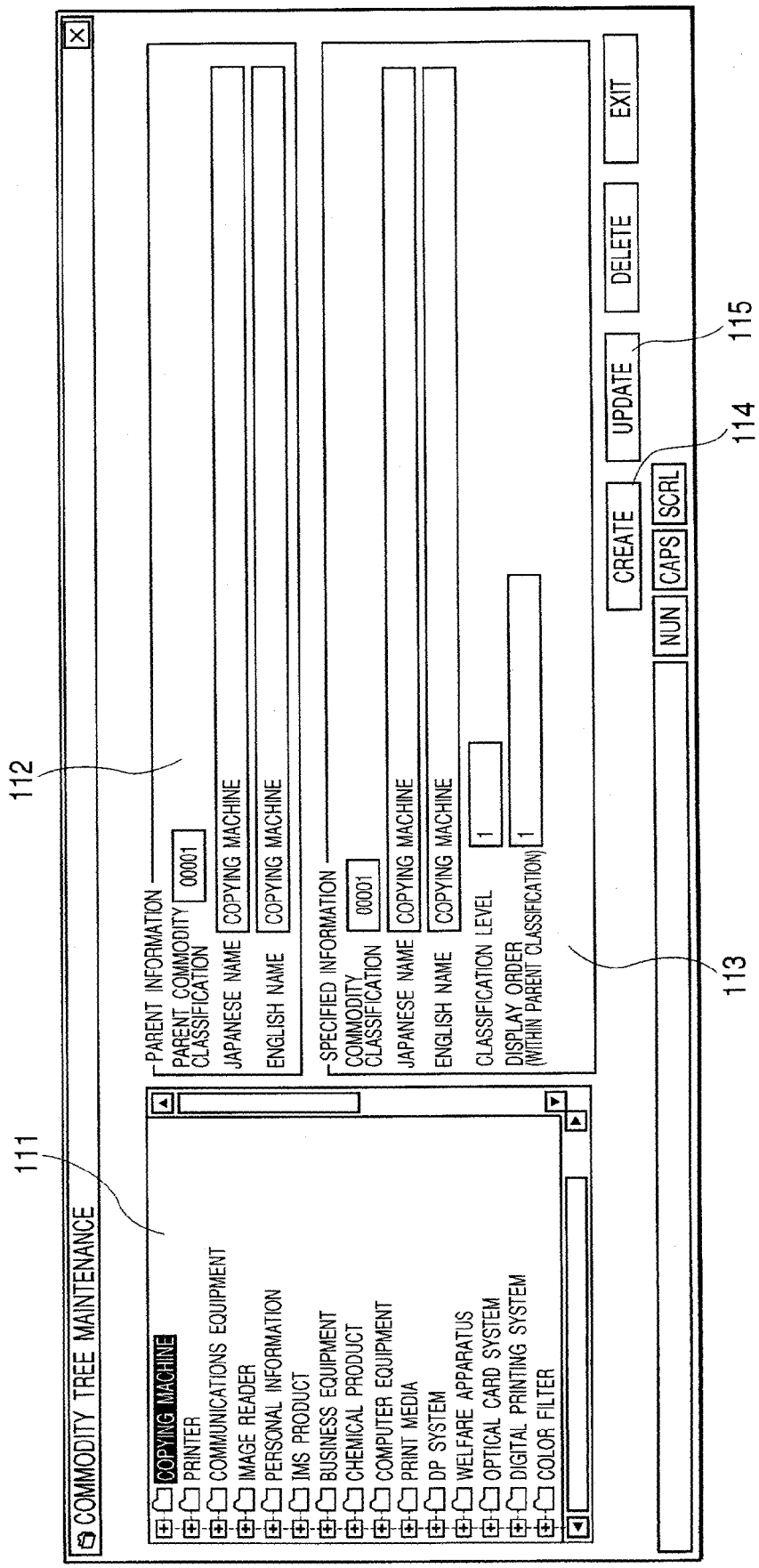
FIG. 11 is a diagram showing a window which appears when Commodity Tree Maintenance is specified.

FIG. 11 shows a window which appears when Commodity Tree Maintenance is specified.

In the figure, an area 111 displays registered commodity classifications, an area 112 displays parent information of a commodity classification specified in the area 111, and an area 113 displays specified information, i.e., information about the very commodity classification specified in the area 111. In the example of FIG. 11, the area 111 is displaying Copying Machine which belongs to commodity classification 1, the area 113 is displaying information about Copying Machine of commodity classification 1, and the area 112 is displaying specified information, i.e., information about the specified classification because commodity classification 1 was specified, above which there is no classification.

A button 114 is used to make a new registration and a button 115 is used to register changes.

Figure 12:
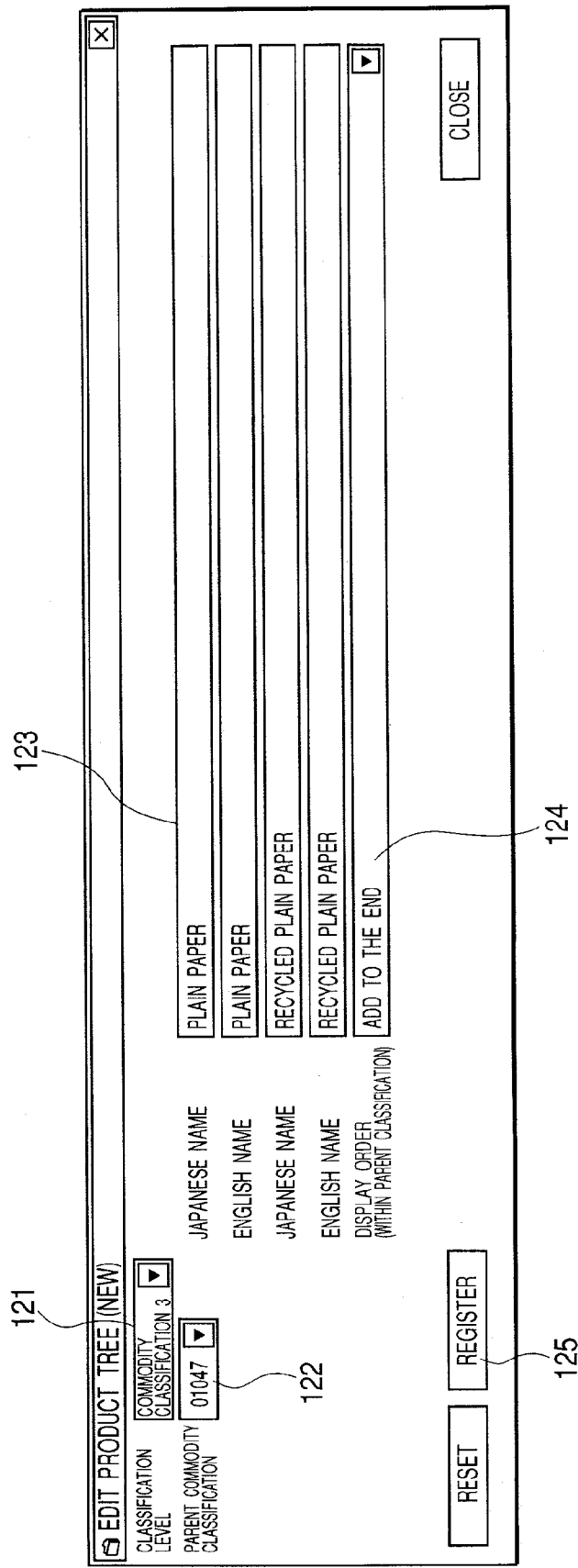
FIG. 12 is a diagram showing a window for making a new registration.

Pressing the button 114 brings up a window shown in FIG. 12. This window allows the user to specify a relationship with an existing registered commodity classification by selecting Commodity Classification 1, Commodity Classification 2, or Commodity Classification 3 in a Classification Level input area 121 and selecting a parent commodity classification in a Parent Commodity Classification input area 122.

Figure 13:
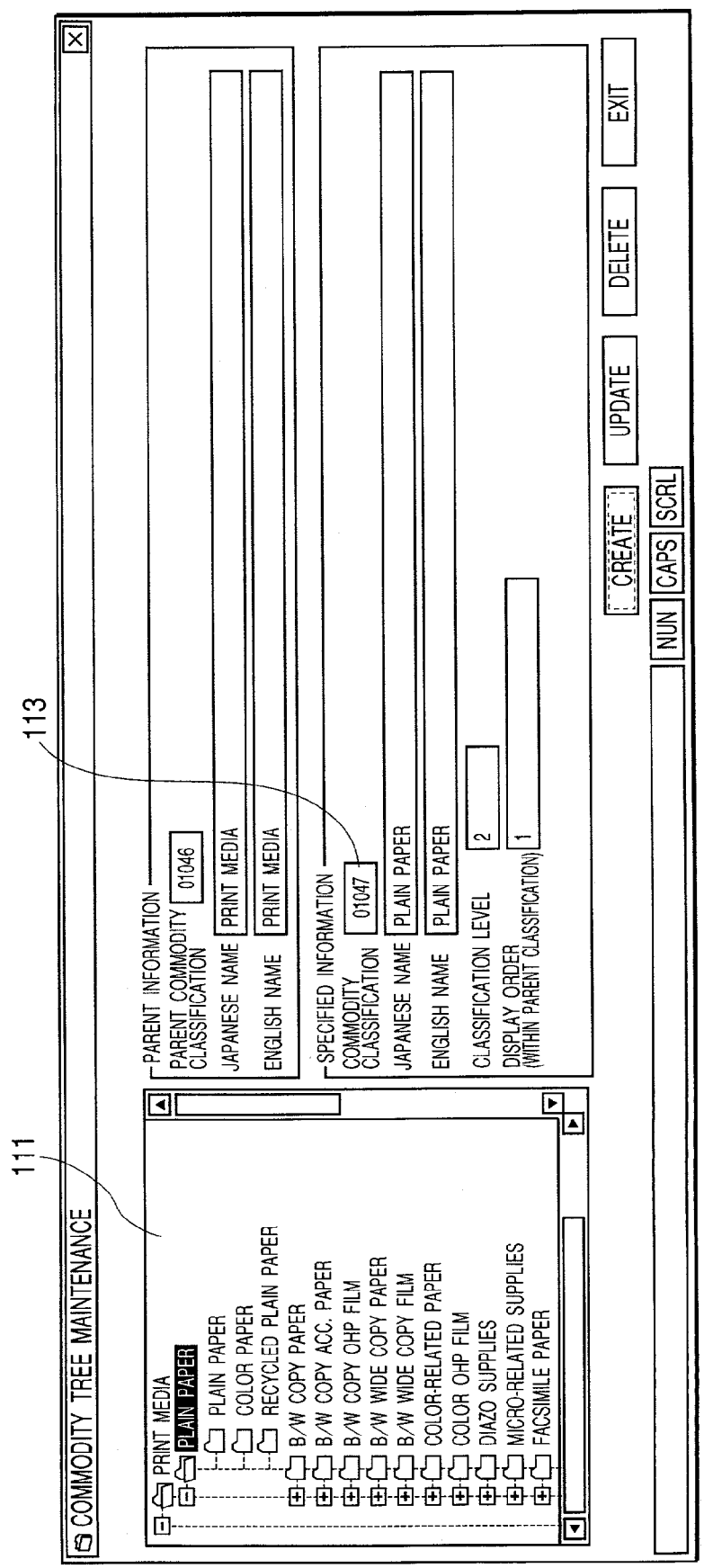
FIG. 13 is a diagram showing a state of the window in FIG. 11 after a commodity classification is specified.

When the user fills in a data input area 123 and presses a Register button 125, the registration is complete. A Display Order input area 124 specifies where to place the new registration. Incidentally, the numeral to be entered in the Parent Commodity Classification input area is the one displayed in the Commodity Classification field in the area 113 when a commodity classification in the area 111 is specified in the window shown in FIG. 13 (the same window as in FIG. 11).

In FIG. 15, it is shown that a registered commodity classification is designated in the Display Order input area 124. For example, by specifying Color Paper, Recycled Plain Paper can be newly registered between Recycled Paper and Color Paper.

Figure 14:
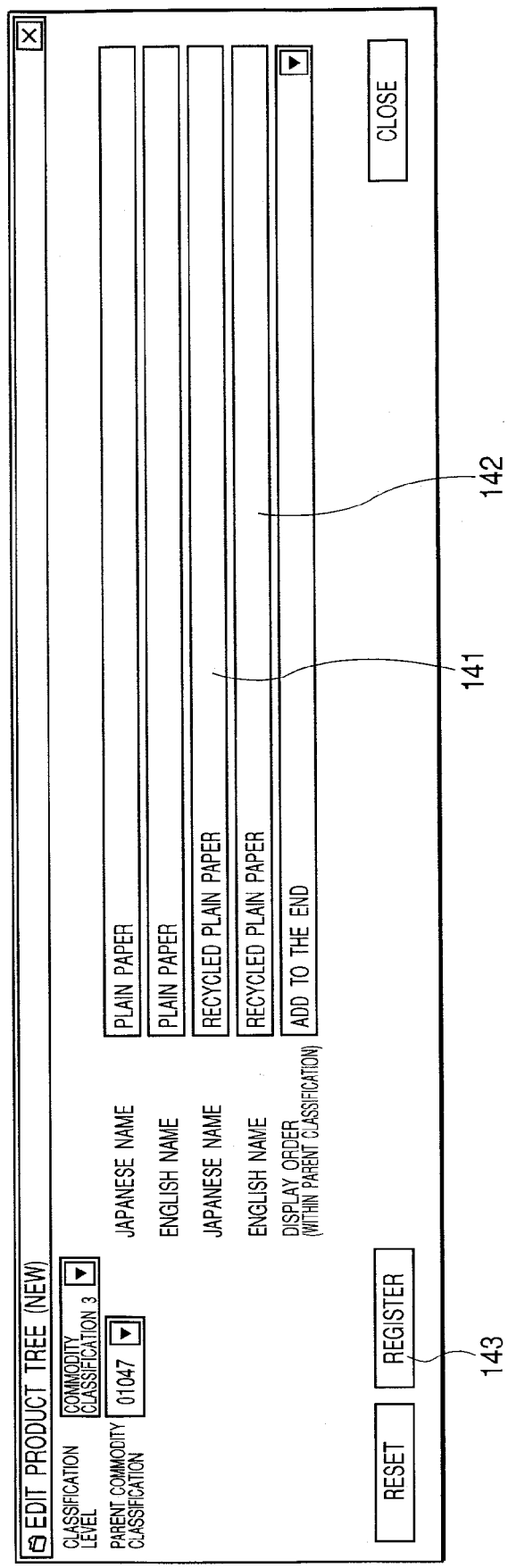
FIG. 14 is a diagram showing a window for registering a change.

To register changes, the Update button 115 should be pressed. A window appears and displays current information as shown in FIG. 14. The user changes the contents of name input areas 141 and 142 and presses the Register button 143 to register the changes.

To change the order of arrangement of classifications, with the changed classification displayed in a window shown in FIG. 15, a position to which a given classification is desired to be moved should be selected in the Display Order input area 151 and then the Register button 152 should be pressed.

[Relationship Between Models and Commodity Codes]

Next, relationship between models and commodity codes will be described.

FIG. 16 shows a relationship between models and commodity code numbering. As shown in the figure, mass-produced products are numbered at the model level. A commodity KIT belongs to the product family tree to which its main component belongs. In the example of figure, when commodity B1 and commodity A2 are packaged into a KIT (bundled), the KIT belongs to model B if commodity B1 is specified as the main component.

[Basic Commodity Code System]

Next, a basic system of commodity codes will be described.

FIG. 17 is a conceptual diagram showing a basic system of commodity codes. As shown in the figure, a commodity code consists of a first level, second level, and third level, which in turn consist of eight digits (first to eighth digits), two digits (ninth and tenth digits), and two digits (eleventh and twelfth digits), respectively, for a total of twelve digits. The first to fourth digits are numeric characters while the sixth to eighth digits are alphanumeric characters, excluding I, O, and S to avoid misreading. The fifth digit represents a commodity category: A to D represent mass-produced products (including OEM products), H represents job-order products, K represents name-brand supplier products, P represents sales promotion material or exceptional goods, Q represents component material for sales companies, R represents net products, and S represents intangible products. The ninth to twelfth digits are specified in a different manner depending on the commodity category. Although three levels are used in the example described above, the number of levels in a commodity code may be determined as necessary.

[Numbering Criteria]

Next, numbering criteria will be described.

(Mass-produced Products)

FIG. 18 is a diagram showing numbering criteria for mass-produced products.

In the case of mass-produced products, reasons for commodity code issuance or changes include differences in models, differences in products, differences in commodities, differences in management, and correction of drawings. The correspondence between the reasons and commodity code levels, i.e., what commodity code level—first, second, or third—represents each reason, is indicated by a circle "○"

The differences in models refer to "differences at the level of series, development names, etc." The differences in products refer to "differences in catalog performance," "differences in installed software," "differences in power or voltage," "differences in exterior design or color," "differences in the name," etc. The differences in commodities refer to "differences in the combination of bundled products," "differences in the number of bundled products," "differences in included printed matter or language," etc. The differences in management refer to "differences in the country of origin," "differences in acquired standards," "differences in software versions," "changes or additions of important components," etc. as well as "local management at each base."

In the case of design changes, a commodity code is issued when it is desired to clarify management responsibilities after drawings of a main unit or accessories are revised.

(Other Commodities)

As shown in FIG. 19, numbering should be done individually for each commodity category.

[Numbering Methods Specific to Product Categories]

Next, numbering methods specific to product categories will be described.

(Mass-produced Products)

FIG. 20 is a diagram illustrating a code numbering method for mass-produced products.

At the time of initial numbering, the second level is initialized to "AA."

If the model portion at the first level exceeds 9999, the commodity category advances from A to B (A to H represent mass-produced product categories).

If the commodity specification portion at the first level exceeds 999, an alphanumeric character (A to D) is used for the first digit of this portion (sixth digit).

At the second level, if the country of origin changes, the first digit (ninth digit) is advanced. If a managed element other than the country of origin (such as acquired standards or software versions) changes, the second digit (tenth digit) is advanced.

Regarding the third level, the initial value of the third level is blank. Characters should be assigned so as to provide global and unique serial numbers when combined with the preceding ten digits (first level+second level). When the third level exceeds 99, an alphabetical character should be used for the second digit (twelfth digit) (1A to 9A). If it exceeds 9Z, an alphabetical character should be used for the first digit (eleventh digit) (A1 to Z9).

(Job-order Products, Etc.)

FIG. 21 is a diagram illustrating a numbering method for job-order products and the like.

Seven digits at the first level (first to fourth, sixth, and seventh digits) excluding the fifth digit which represents a commodity category compose a serial number. The initial value of the second level is blank.

Serial numbers are used at the second level, being classified by shipment, specification, and version.

(Intangible Products)

FIG. 22 is a diagram illustrating a numbering method for intangible products.

Seven digits at the first level (first to fourth, sixth, and seventh digits) excluding the fifth digit which represents a commodity category compose a serial number.

[Commodity Code Numbering Flow]

Next, a commodity code numbering flow will be described.

Figure 23:
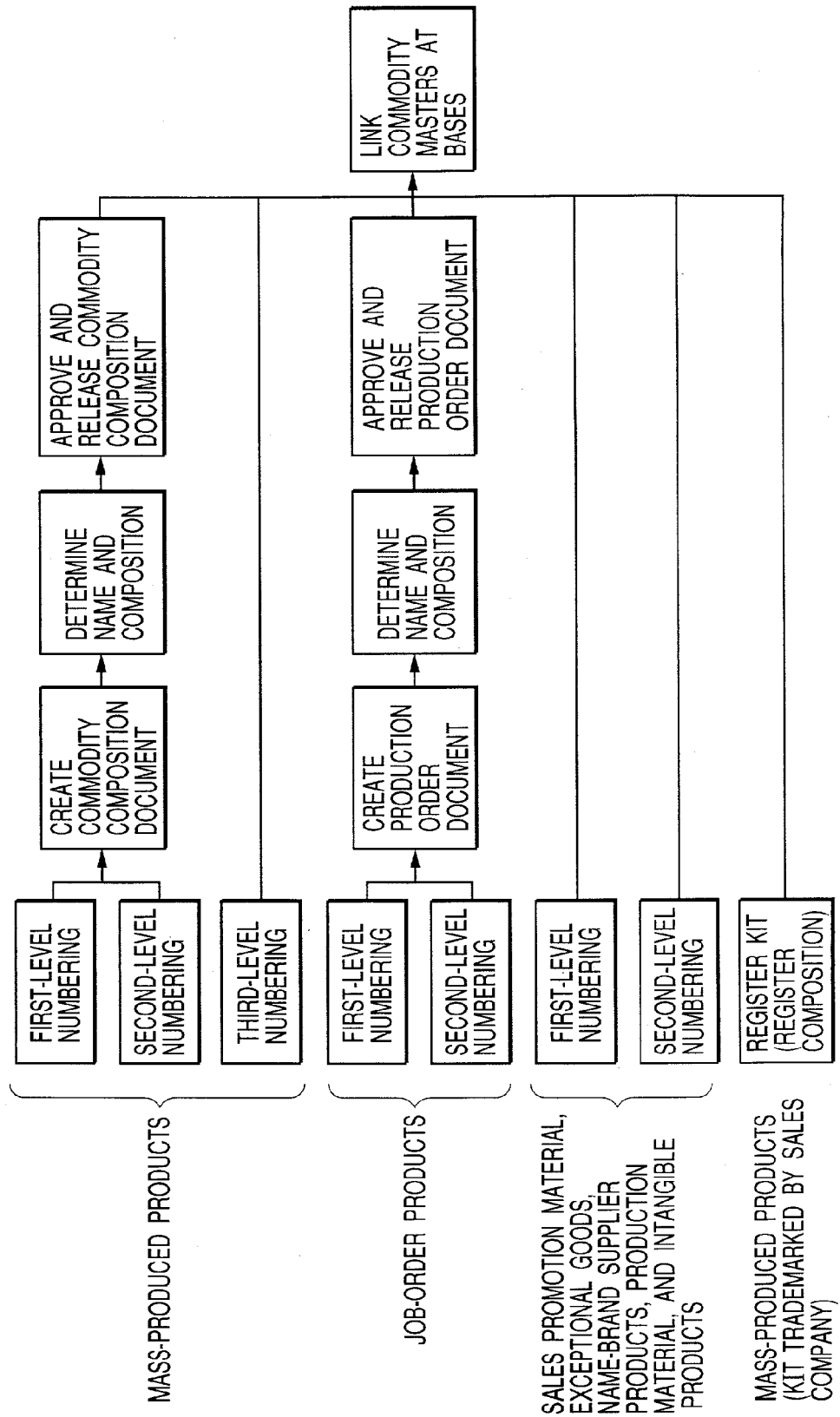
FIG. 23 is a conceptual diagram showing a commodity code numbering flow.

FIG. 23 is a conceptual diagram showing a commodity code numbering flow.

In the case of mass-produced products, it is mandatory to create a commodity composition document when a commodity code is issued. Release of the commodity composition document makes it possible to link commodity masters at individual bases. In the case of mass-produced kits, there is no need to register a commodity composition document. The commodity masters at individual bases can be linked just as a commodity code is issued.

In the case of job-order products, it is mandatory to create a production order document when a commodity code is issued. Release of the production order document makes it possible to link commodity masters at individual bases.

In the case of commodities other than mass-produced products and job-order products, the commodity masters at individual bases can be linked just as the first and second levels of a commodity code are issued. No commodity composition document or production order document is required.

[Basic Idea of Commodity Composition Documents]

The basics of commodity composition documents will be described.

If a commodity composition changes, the first level of the commodity code is issued anew and a commodity composition document is created, regarding the commodity as different from the original one. The commodity composition document is kept for the first and second levels of the commodity code and is not changed if the commodity is the same (i.e., the first level is the same) even if the base (e.g., the production plant) changes.

As an exception, however, the commodity composition document has the capability to manage two or more compositions for the same product (i.e., the first level is the same). Examples include a case in which a large order changes for the same product due to a difference in the production plant or a case in which there are two or more alternative codes for the same component item. The term "large order" refers to a destination-specific code which represents a commodity (=product+accessories+printed matter+packing material). It is used for unit control during travel from the plant to the user as well as for production and sales planning. It is issued by the planning department of a business. It consists of a medium order—which is a code that represents the main unit of a product (including options)—and a destination code. The medium order serves as a basis for work-in-process inventory management and material explosion.

Roughly speaking, commodity composition documents contain the following information: name information, composition information, control items, package labels, a correction record, description, and document recipients. Details will be described later.

[Management Pattern of a Commodity Composition Document]

Next, a management pattern of a commodity composition document will be described.

Figure 24:
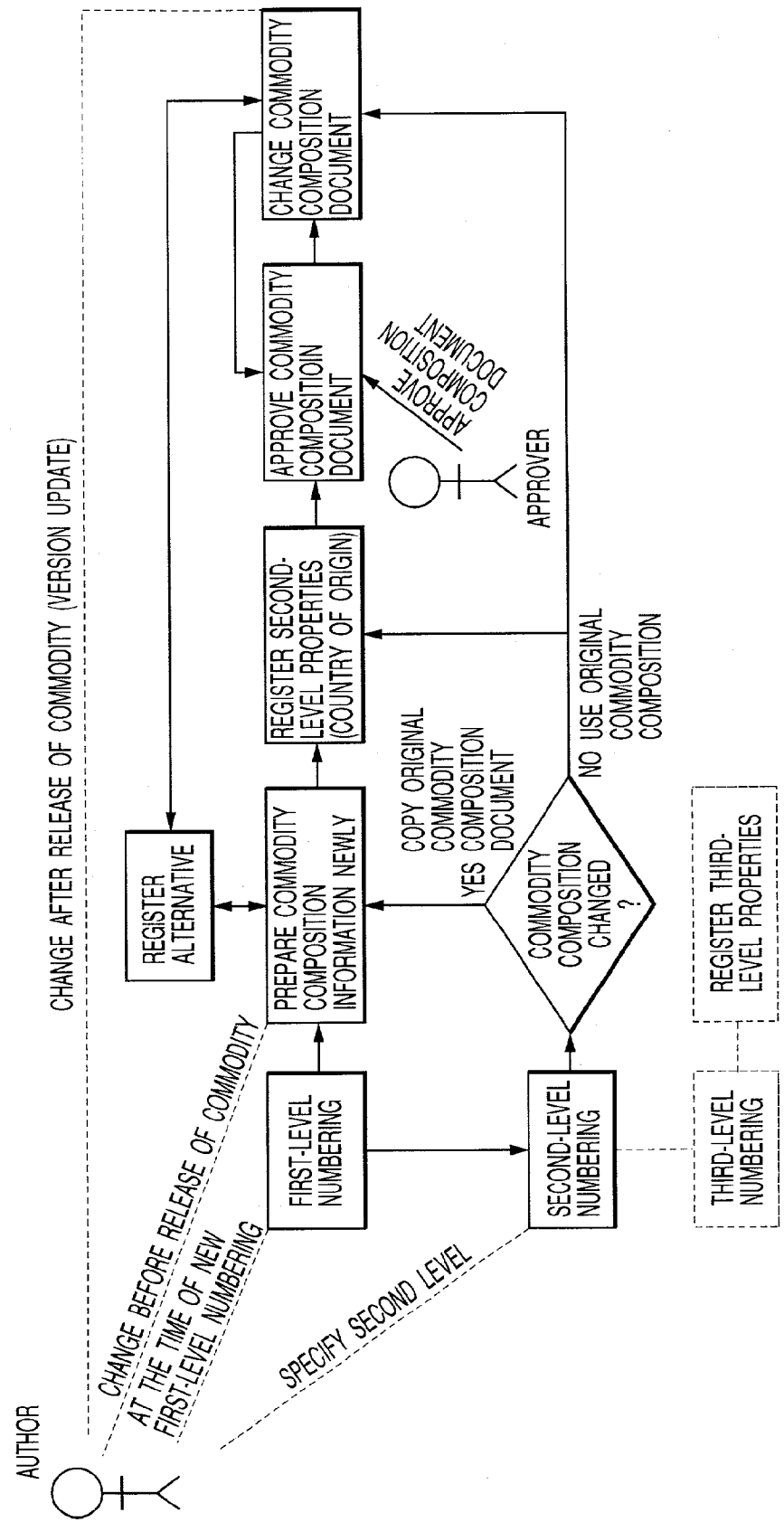
FIG. 24 is a conceptual diagram showing a management pattern of a commodity composition document.

FIG. 24 is a conceptual diagram showing a management pattern of a commodity composition document.

The procedure for newly issuing the first level is as follows: the first level of a commodity code is issued, commodity composition information is prepared a new, and the commodity composition document is approved (released).

The procedure for newly issuing the second level is as follows if the commodity composition is unchanged: the second level of the commodity code is specified, it is judged whether the commodity composition has been changed, properties related to the second level (the country of origin, etc.) are registered, and the commodity composition document is approved (released). If the second order is changed, the procedure is as follows: the second level of the commodity code is specified, it is judged that the commodity composition has been changed (the original commodity composition document is copied), a commodity composition document is created anew, properties related to the second level (the country of origin, etc.) are registered, and the commodity composition document is approved (released).

[Basic Idea of the Process of Issuing a Commodity Composition Document]

Now, basic ideas of the process of issuing a commodity composition document will be described.

From the issuance of a commodity code to the release of a commodity composition document, the document is treated as DRAFT and all entries of the document except the commodity code are allowed to be changed. However, revision numbers are not managed. Revision numbers are attached to versions of the commodity composition document to manage revision history of the commodity composition document.

After the commodity composition document is released, the commodity code can be registered in base masters. To limit those who can view the commodity composition document, a distribution list of the composition document is specified. After the release of the commodity composition document, if changes are made to the commodity composition document, the revision number is increased and the changes are managed.

"Display Name" and "POS Code" fields in the commodity composition document are shared globally (system-wide). If any change is made to these fields, the numbering staff should notify bases about the change and gives instructions to make changed to the relevant commodity masters at the bases.

[Status of a Commodity Composition Document and Management of Revised Number]

Figure 25:
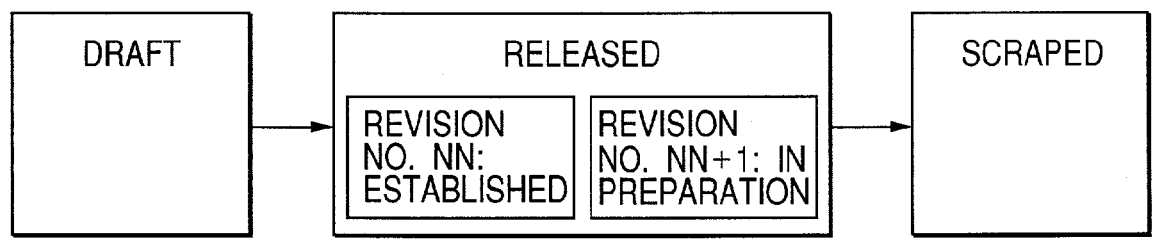
FIG. 25 is a diagram showing status changes of a commodity composition document.

As shown in FIG. 25, the status of a commodity composition document changes.

(Draft)

This status exists between the time when a commodity code is issued and the time when approval is provided. It allows any change to be made to the entries of the document.

(Released)

This status exists between the time when approval is provided by an approver with approval authority and the time when the commodity composition document is scrapped. It allows the commodity code to be linked to base commodity masters. In the RELEASED status, revision numbers are managed. In this status, two types of status are managed further: ESTABLISHED status for a revision number NN and IN PREPARATION status for a revision number NN+1. When any change is entered with respect to the ESTABLISHED version with the revision number NN, the version with the revision number NN+1 attains IN PREPARATION status.

(Scraped)

The user who registered the composition document can set its status to SCRAPPED. A composition document with SCRAPPED status cannot be changed, but can be searched for.

[Access Authority to a Commodity Composition Document]

Next, access authority to a commodity composition document will be described.

(Recipients of a Commodity Composition Document)

When a commodity composition document is created, bases to which it will be released are specified using a code. For a global commodity, "ALL" is specified, meaning all bases.

(Status of a Commodity Composition Document)

The status of a commodity composition document has been described above, and thus description thereof will be omitted.

(Access Authority)

The following types of access authority are provided.

Supplier's revise/scrap authority allows the appropriate user to register models, issue commodity codes, and update commodity composition documents (including preparation orders).

Seller's revise/scrap authority allows the appropriate user to issue commodity codes and register kit compositions within the company the user belongs to.

Composition search authority (ALL status) allows the appropriate user to search for commodity composition documents which have DRAFT or RELEASED status.

Composition search authority (RELEASED status) allows the appropriate user to search for commodity composition documents which have RELEASED status.

Commodity search authority (RELEASED status) allows the appropriate user to search for commodity codes which have RELEASED status.

Commodity composition approval authority allows the appropriate user to approve commodity codes with DRAFT or RELEASED status within the company or business the user belongs to.

[Description of Operation]

Next, description will be given about actual manipulations to be performed by the user to operate the system with the above configuration.

The user who intends to use this system enters his/her user code and personal identification number on a terminal at a base. Then, the user can use functions associated with the user code, within his/her access authority.

Figure 26:
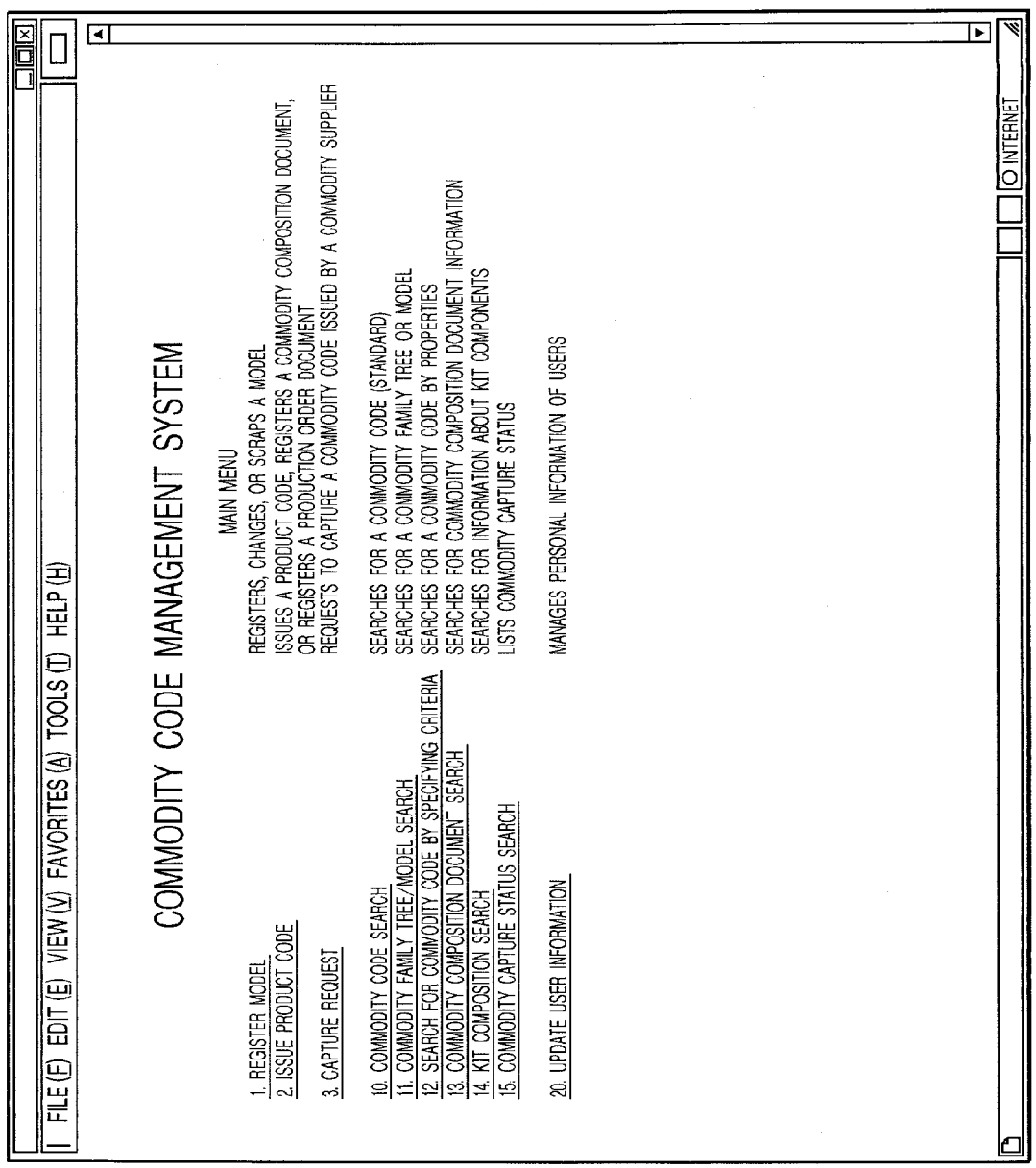
FIG. 26 is a diagram showing a main screen during operation of this system.

When the user enters his/her user code and personal identification number, a screen such as the one shown in FIG. 26 appears. Incidentally, the screen shown in the figure is the one that appears when all the functions are available.

(Registering a Model)

Registration of a model will be described. It is assumed that commodity classifications 1, 2, and 3 have already been registered by the administrator of this system.

Figure 27:
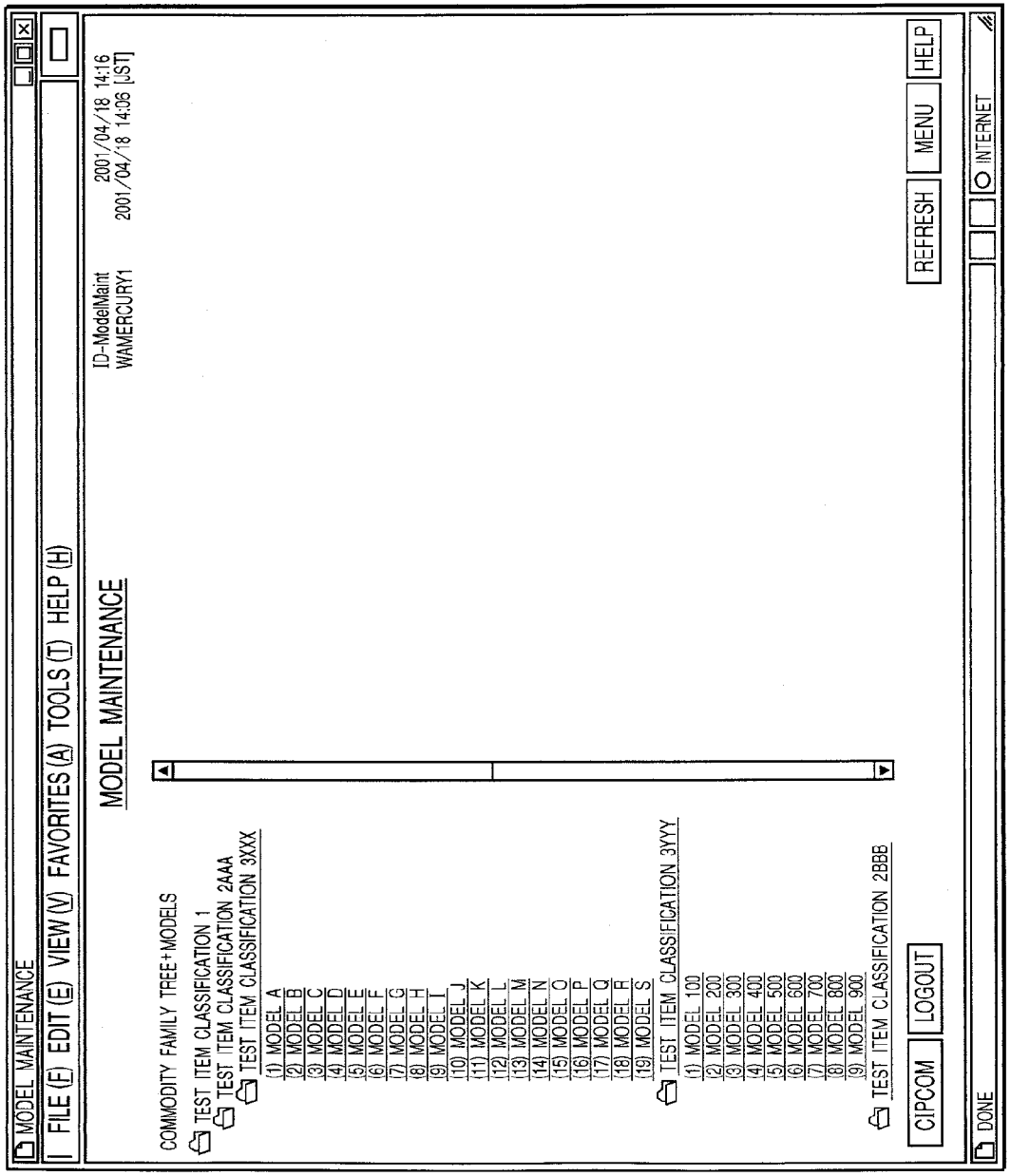
FIG. 27 is a diagram showing a screen displayed when registering or deleting models.

When the user selects "Register Model" in FIG. 26, a screen such as the one shown in FIG. 27 appears. To register a model, the user selects, on the screen, the classifications 1, 2, and 3 to which the model belongs.

The example, FIG. 27 shows a screen in which TEST ITEM Classification 1, TEST ITEM Classification 2AA, and TEST ITEM Classification 3XXX have been selected as commodity classification 1, commodity classification 2, and commodity classification 3, respectively.

Figure 28:
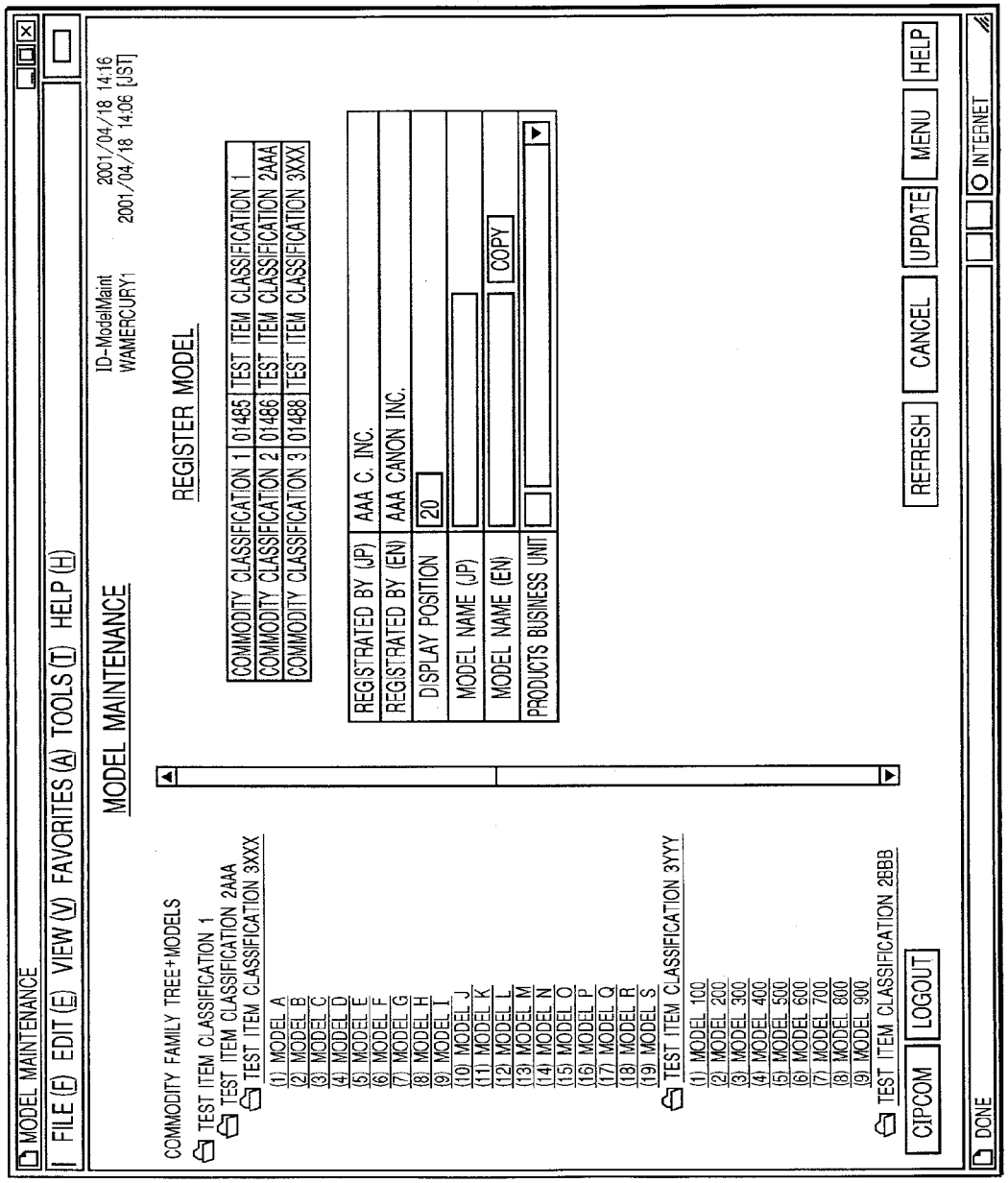
FIG. 28 is a diagram showing a screen displayed when registering or deleting models.

In this status, if the user selects TEST ITEM Classification 3XXX of commodity classification 3 further, "Register Model" screen appears in the right area of the screen (FIG. 28).

The Register Model area in FIG. 28 shows that selected commodity classifications 1, 2, and 3, are TEST ITEM Classification 1, TEST ITEM Classification 2AA, and TEST ITEM Classification 3XXX, respectively. Furthermore, the name of the base (company) which registered the model is displayed in Japanese and English.

Display Position shows the display order of a model in TEST ITEM Classification 3XXX. It defaults to the lowest row (the row next to MODEL S). By entering a smaller number, the user can change the display position.

The Model Name fields accept up to 15 Japanese or alphabetic characters. Products Business Unit is the business entity at the base.

As the user enters necessary data and presses (e.g., clicks with a mouse) the "Register" button, a new model code is registered.

Figure 29:
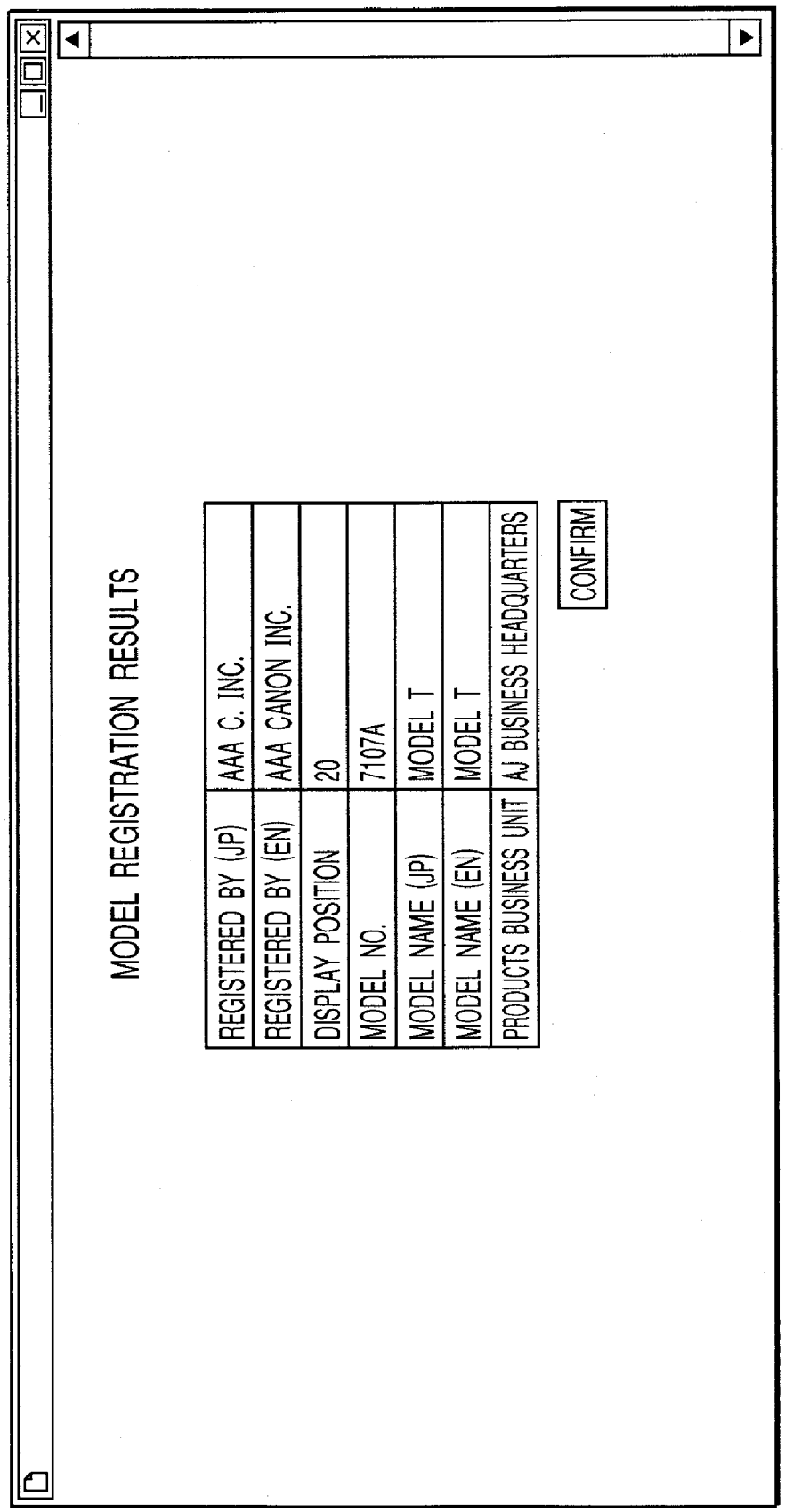
FIG. 29 is a diagram showing a screen displayed when registering or deleting models.
Figure 30:
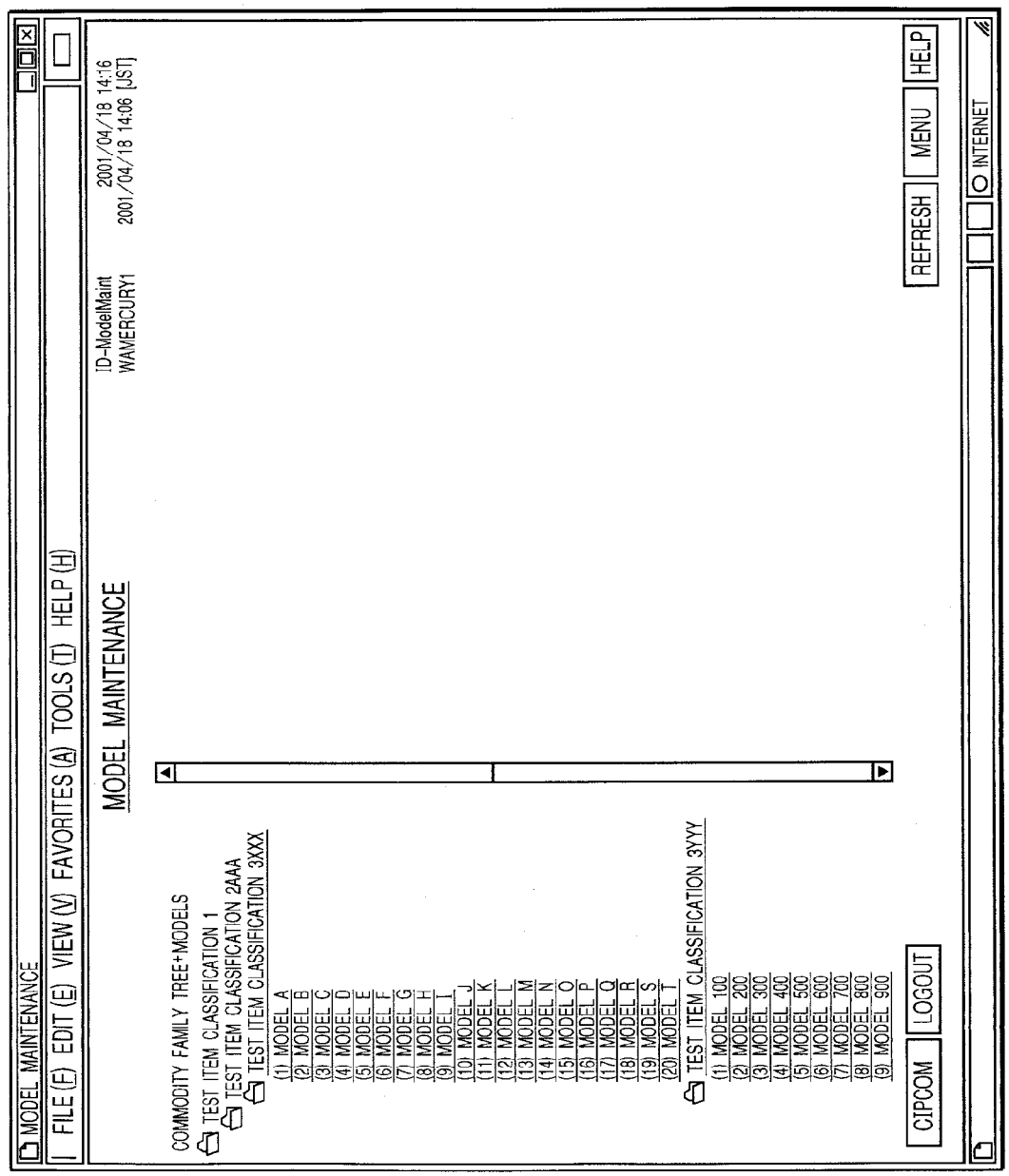
FIG. 30 is a diagram showing a screen displayed when registering or deleting models.

When the registration is completed successfully, the model number issued and details of the registration are displayed (FIG. 29). By pressing the "Confirm" button, the user can exit the screen (return to FIG. 27 according to this embodiment). By pressing the "Refresh" button, the user can verify that the results of the registration has been reflected in the commodity family tree (FIG. 30).

(Changing a Model)

Figure 31:
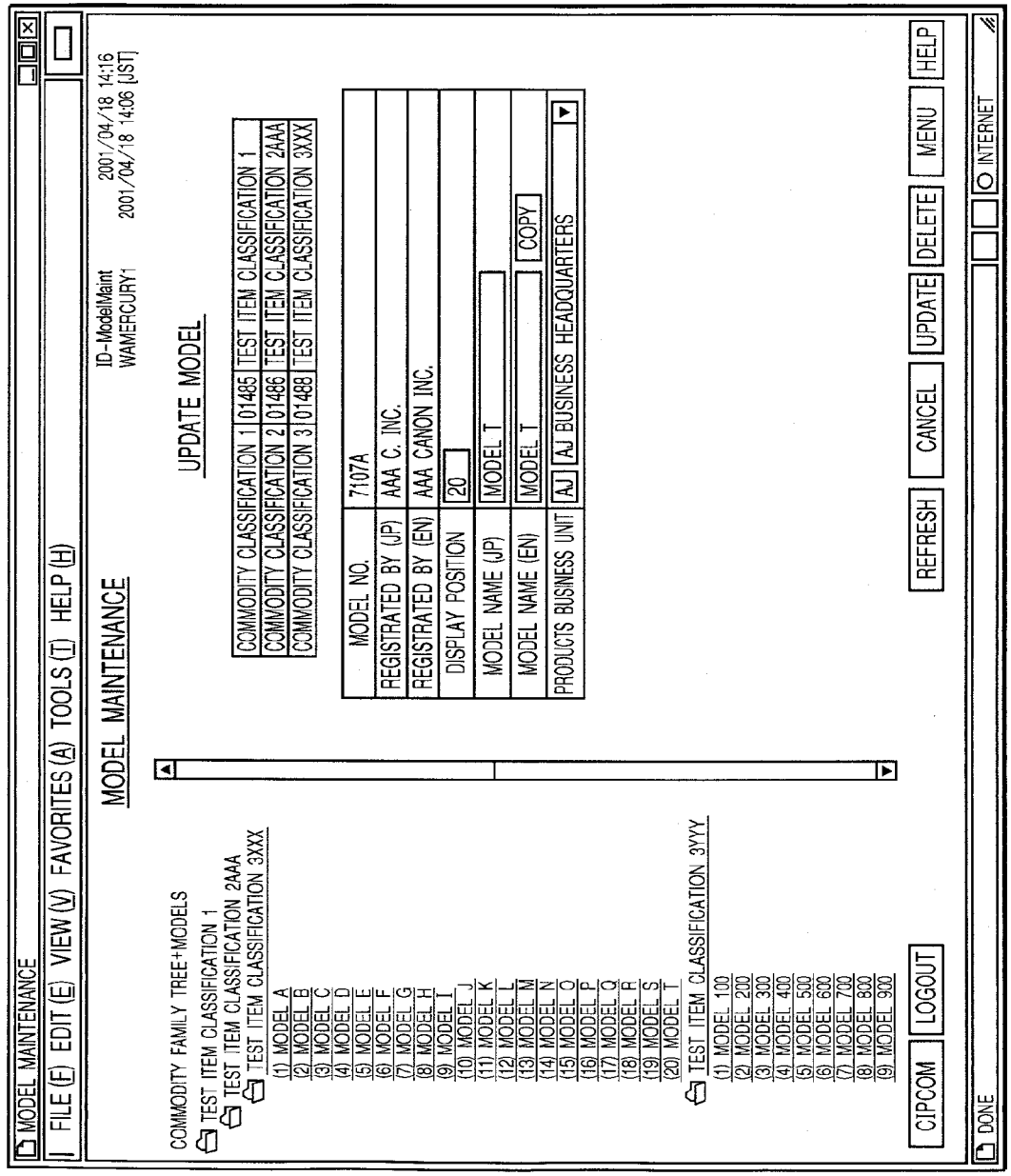
FIG. 31 is a diagram showing a screen displayed when changing models.

If the user wants to change registration data (Name, Display Position, or Products Business Unit), he/she should select the desired model name in FIG. 27 described above (or FIG. 30). Then, the current registration data of the selected model appears in the right area of the screen (FIG. 31). As the user enters changes and presses the "Update" button, the registration data is changed.

Figure 32:
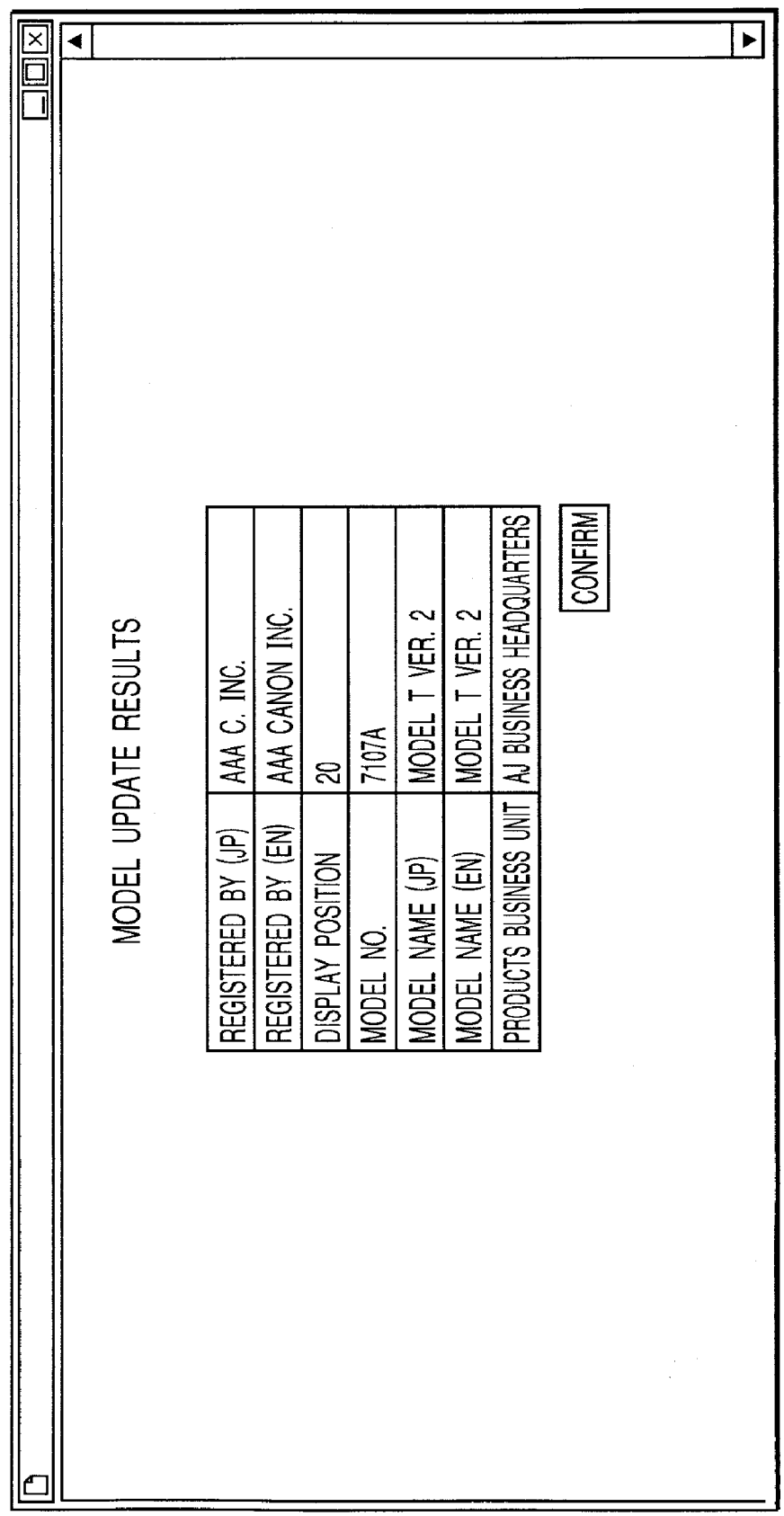
FIG. 32 is a diagram showing a screen displayed when changing models.

When the change is completed successfully, the registration data is displayed (FIG. 32). Pressing the "Confirm" button exits the screen (returns to FIG. 27).

(Deleting a Model)

Figure 33:
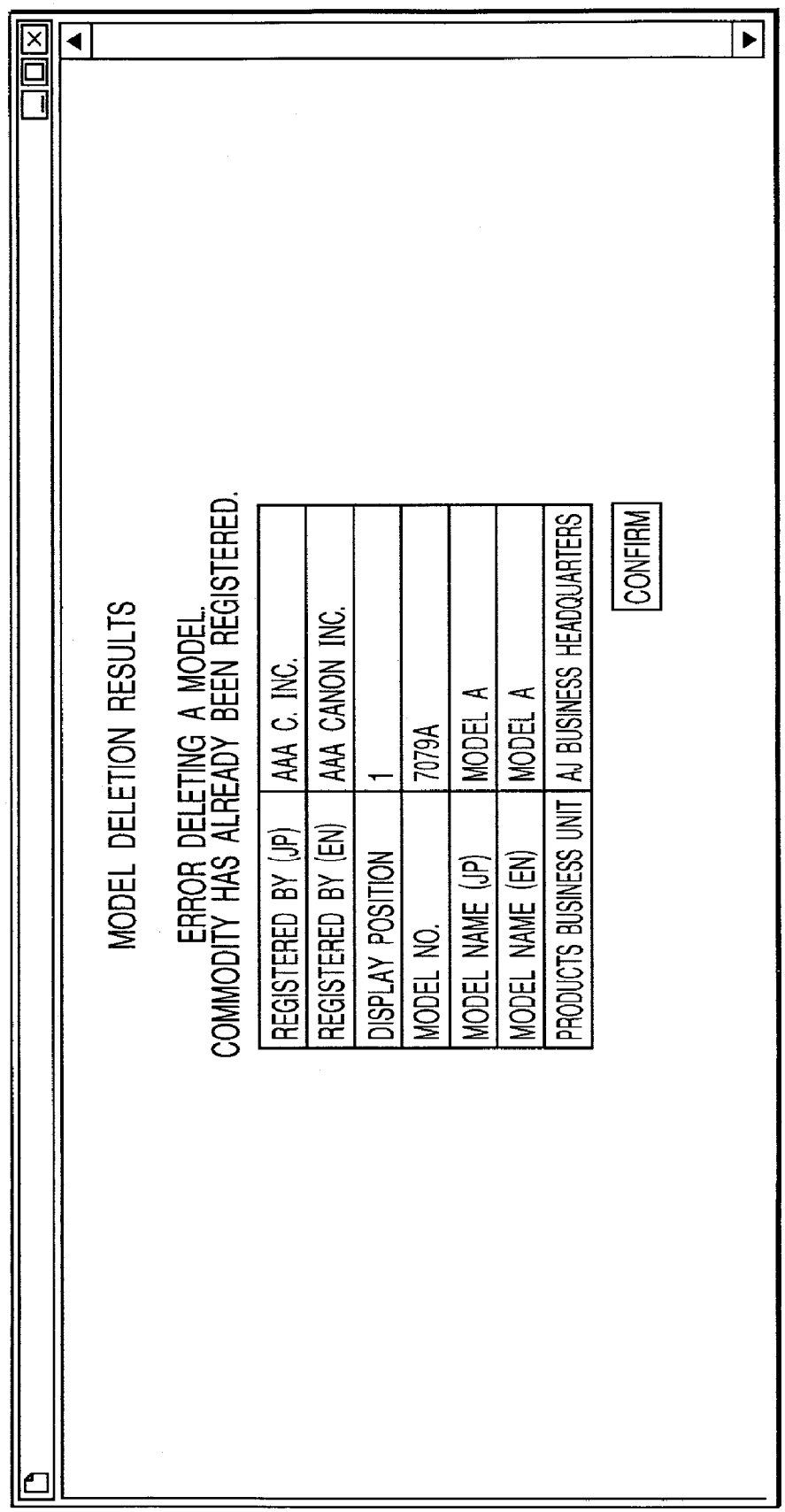
FIG. 33 is a diagram showing a screen displayed when deleting models.
Figure 34:
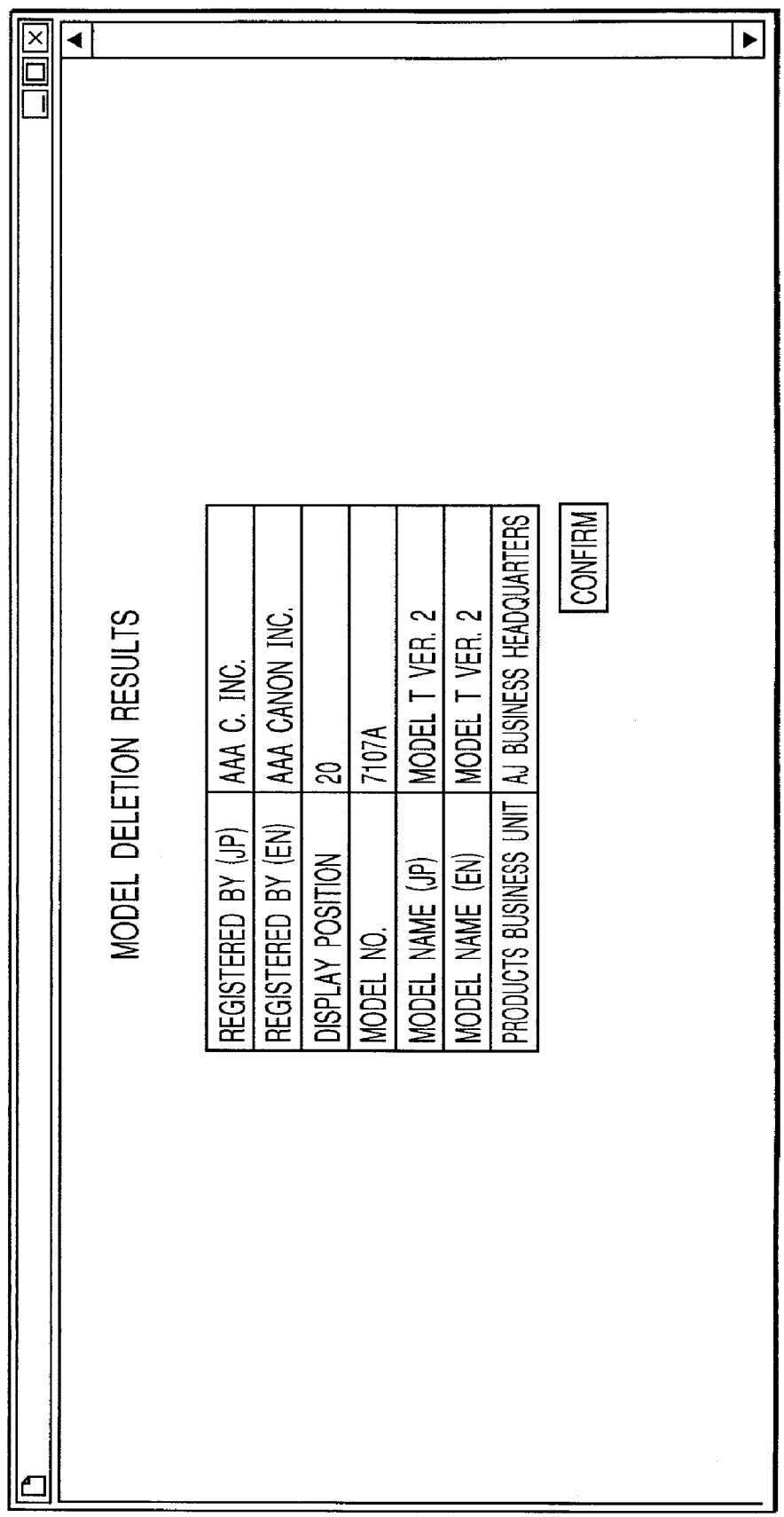
FIG. 34 is a diagram showing a screen displayed when deleting models.

In FIG. 31 described above, pressing the "Delete" button specifies deletion. If a commodity code has already been issued, the model is not deleted and the error message shown in FIG. 33 appears. If the model is deleted successfully, the results of deletion shown in FIG. 34 is displayed. Pressing the "Confirm" button exits the screen (returns to FIG. 27).

(Searching for a Model or Commodity)

As the user selects "Issue Commodity Code" in FIG. 26, a screen such as the one shown in FIG. 35 appears.

As shown in FIG. 35, the upper area is used to search for a model or commodity by specifying criteria while the lower area is used to search for a model using a commodity family tree.

Figure 36:
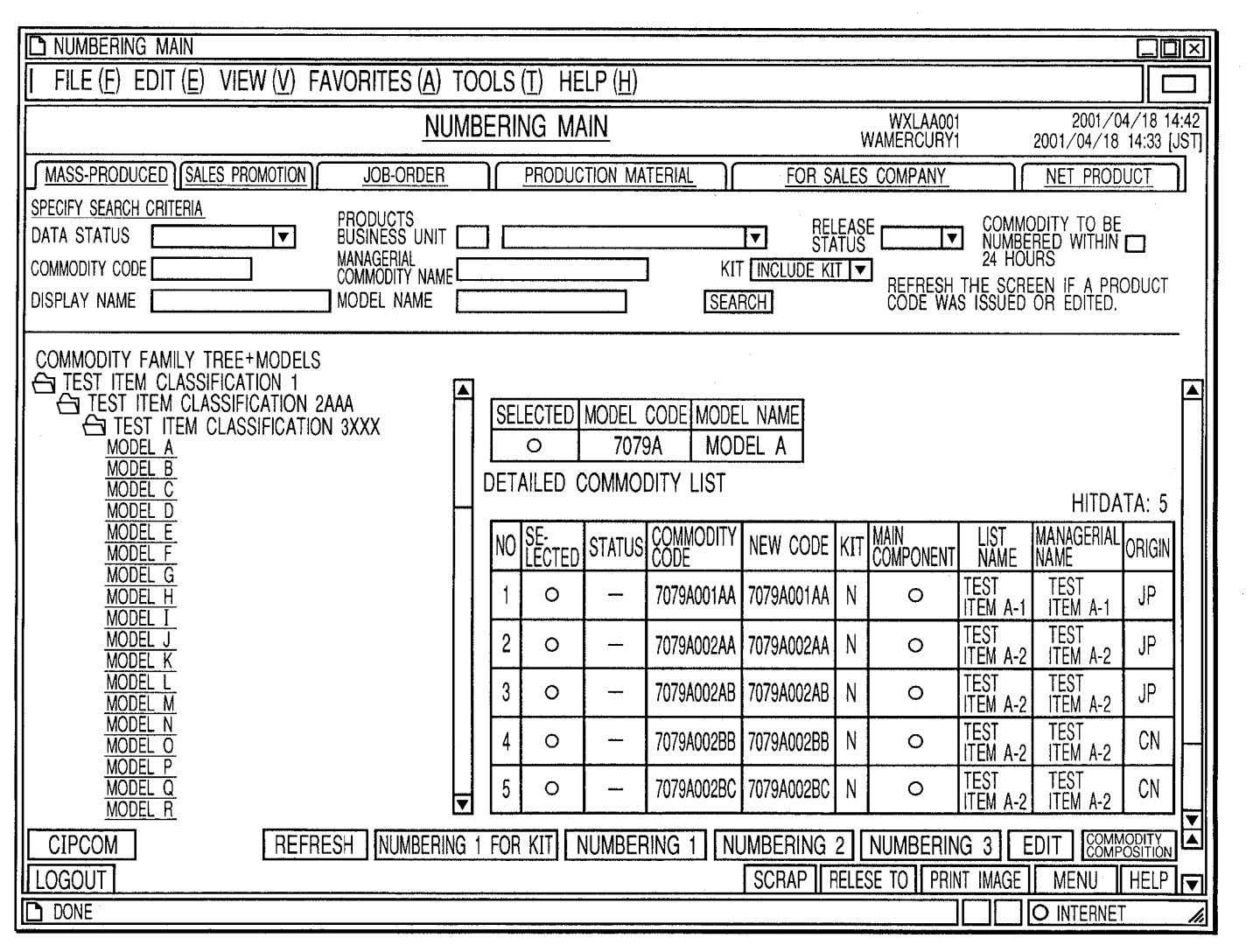

In the lower area, the user can search for a model or commodity using the commodity family tree as follows: when the user selects a commodity classification 1, commodity classifications 2 below it are displayed, and when the user selects a commodity classification 2, models below it are displayed. Then, when the user selects a desired model, information about the selected model as well as a list of existing commodity codes below the model are displayed in the right area of the screen (FIG. 36). The total number of existing commodity codes below the model are indicated by "HitData." The number of lines displayed at a time is limited to improve response. To view more information, "Next Page" or "Previous Page" can be used.

To search for a model or commodity by specifying criteria in the upper area in FIG. 35, the user should fill in a criteria input area in the upper area and press the "Search" button.

The following search criteria can be used.

1. Commodity Code: Retrieves data which begins with a 1- to 12-digit code entered.
2. Display Name and Managerial Name: Retrieves data which begins with a 1- to 22-digit code entered.
3. Model Name: Retrieves data which begins with a 1- to 30-digit code entered.
4. Products Business Unit: Retrieves a product business unit which exactly matches a product business unit selected from a pop-up menu.

When specifying two or more criteria on the same screen, the AND operator can be used.

Search results are displayed in the lower area (FIG. 37).

Although description of the embodiment below cites a case in which a model or commodity is searched for using a commodity family tree in the lower area, the procedures apply similarly to a case in which a model or commodity is searched for by specifying criteria in the upper area.

(First-level Numbering)

As described above, when the user selects a desired model, a detailed commodity list is displayed in the right area (FIG. 36).

Figure 38:
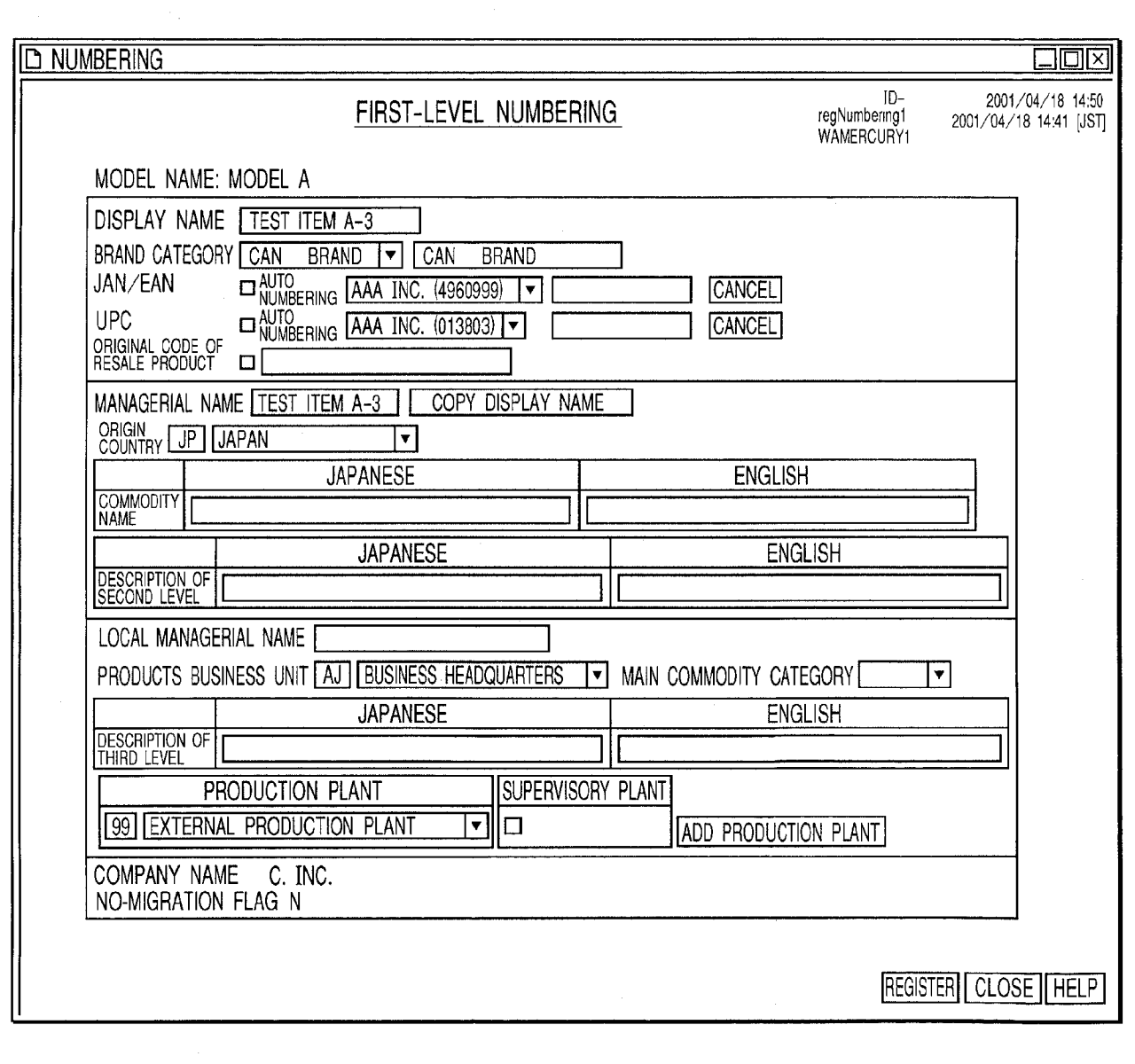

As the user clicks a displayed model code radio button to turn it on and clicks the "First-level numbering" button, a data input screen such as the one shown in FIG. 38 appears.

There are two types of input field: required fields and optional fields. When the user fills them out and presses the "Register" button, a commodity code is issued and a screen such as the one shown in FIG. 39 appears. Pressing the "Close" button on this screen takes the user back to Numbering Main Screen (FIG. 35).

(Second-level Numbering)

Figure 40:
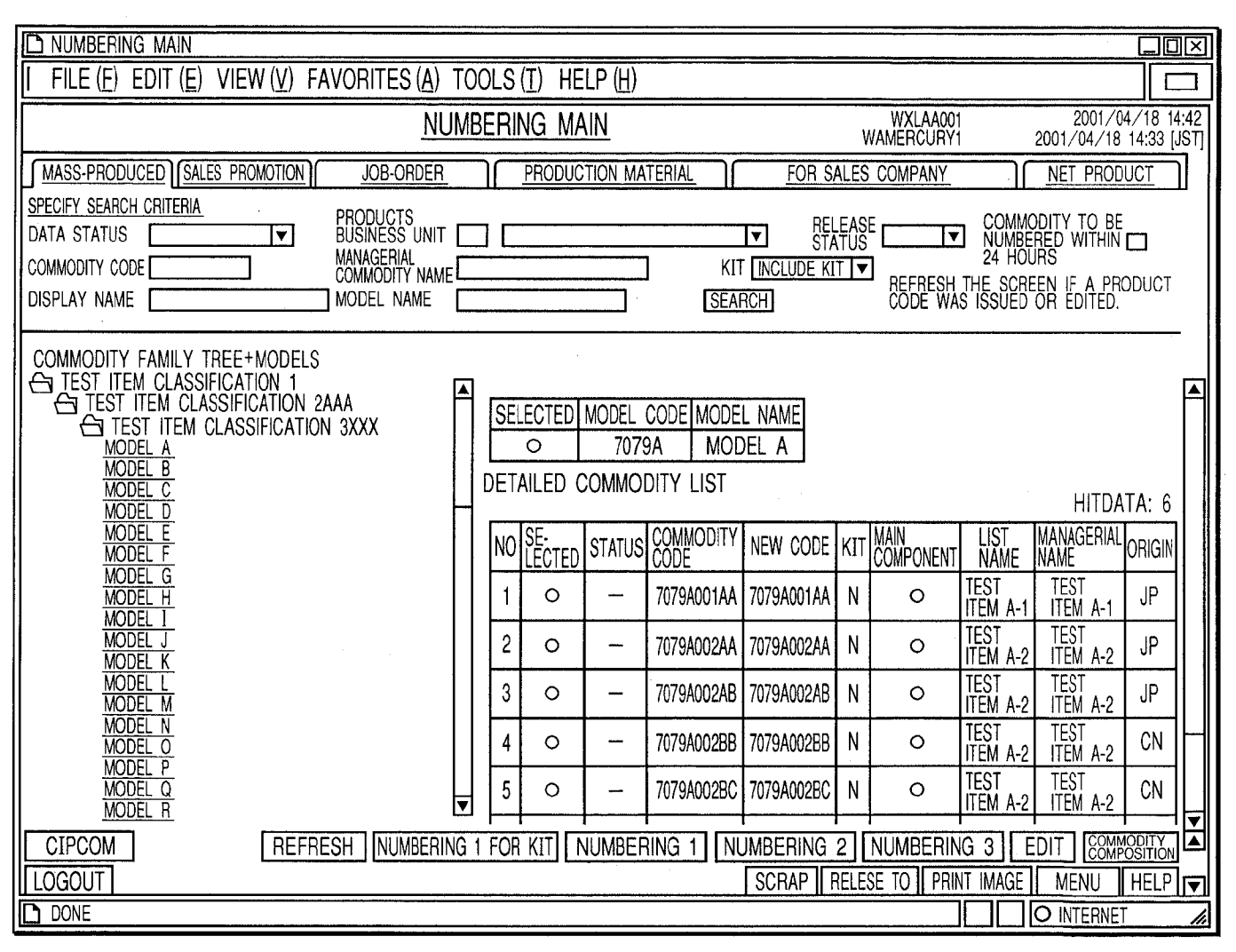
Figure 41:
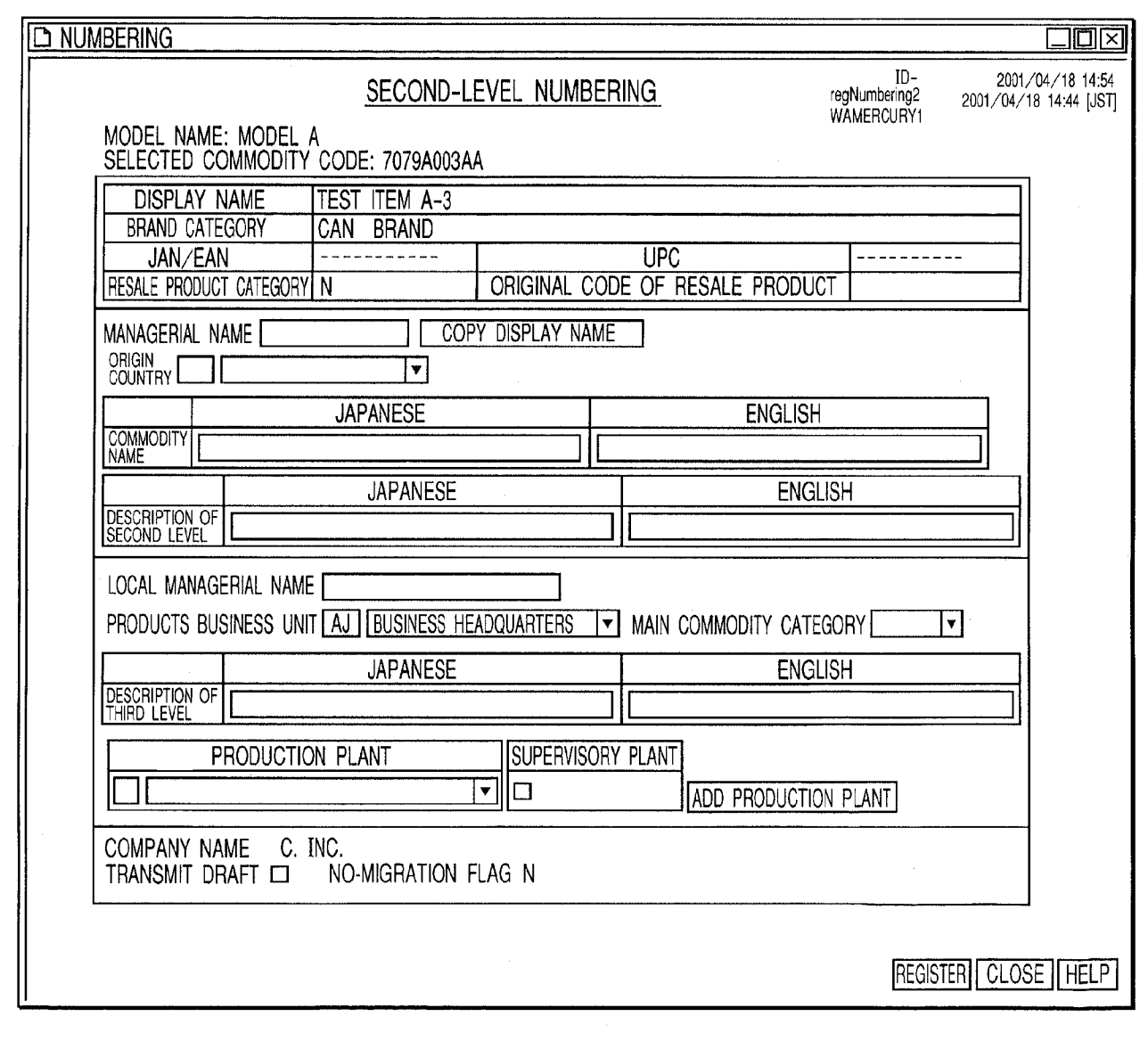

In FIG. 36 described above, as the user selects a desired commodity (FIG. 40) by turning on its commodity code radio button and clicks the "Second-level numbering" button, a data input screen such as the one shown in FIG. 41 appears.

There are two types of input field: required fields and optional fields. When the user fills them out and presses the "Register" button, a commodity code is issued and a screen such as the one shown in FIG. 42 or 43 appears. Pressing the "Close" button on this screen takes the user back to the Numbering Main Screen (FIG. 35). The "close" button returns to the numbering main screen (FIG. 35).

The difference between FIG. 42 and FIG. 43 is that FIG. 42 is displayed when the same "Origin Country" as that of the selected commodity is specified while FIG. 43 is displayed when an "Origin Country" different from that of the selected commodity is specified.

Figure 44:
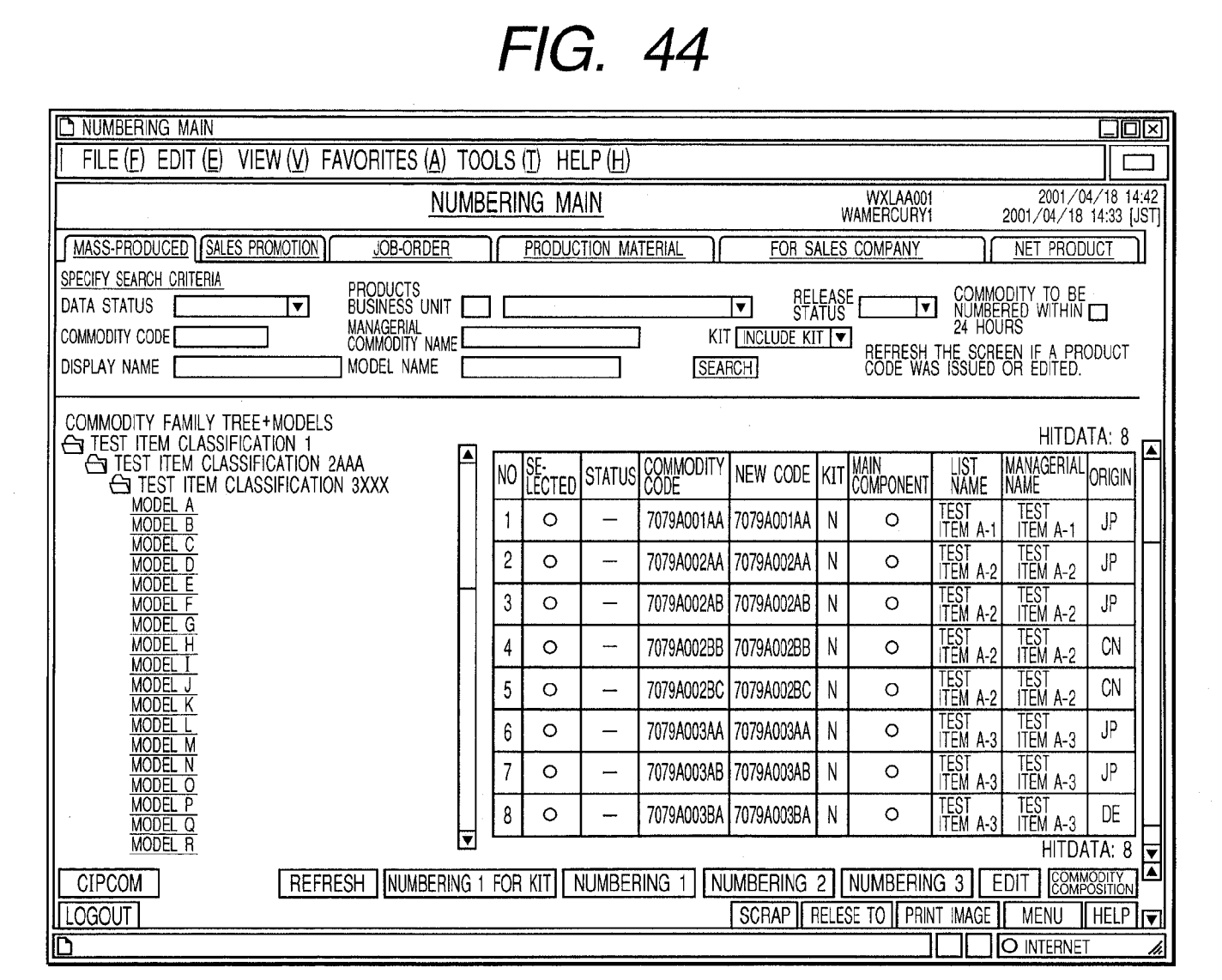

After registration, as the user presses the "Refresh" button in the "Numbering Main Screen," a screen such as the one shown in FIG. 44 appears, allowing the user to verify the results of the registration.

(Third-level Numbering)

Figure 45:
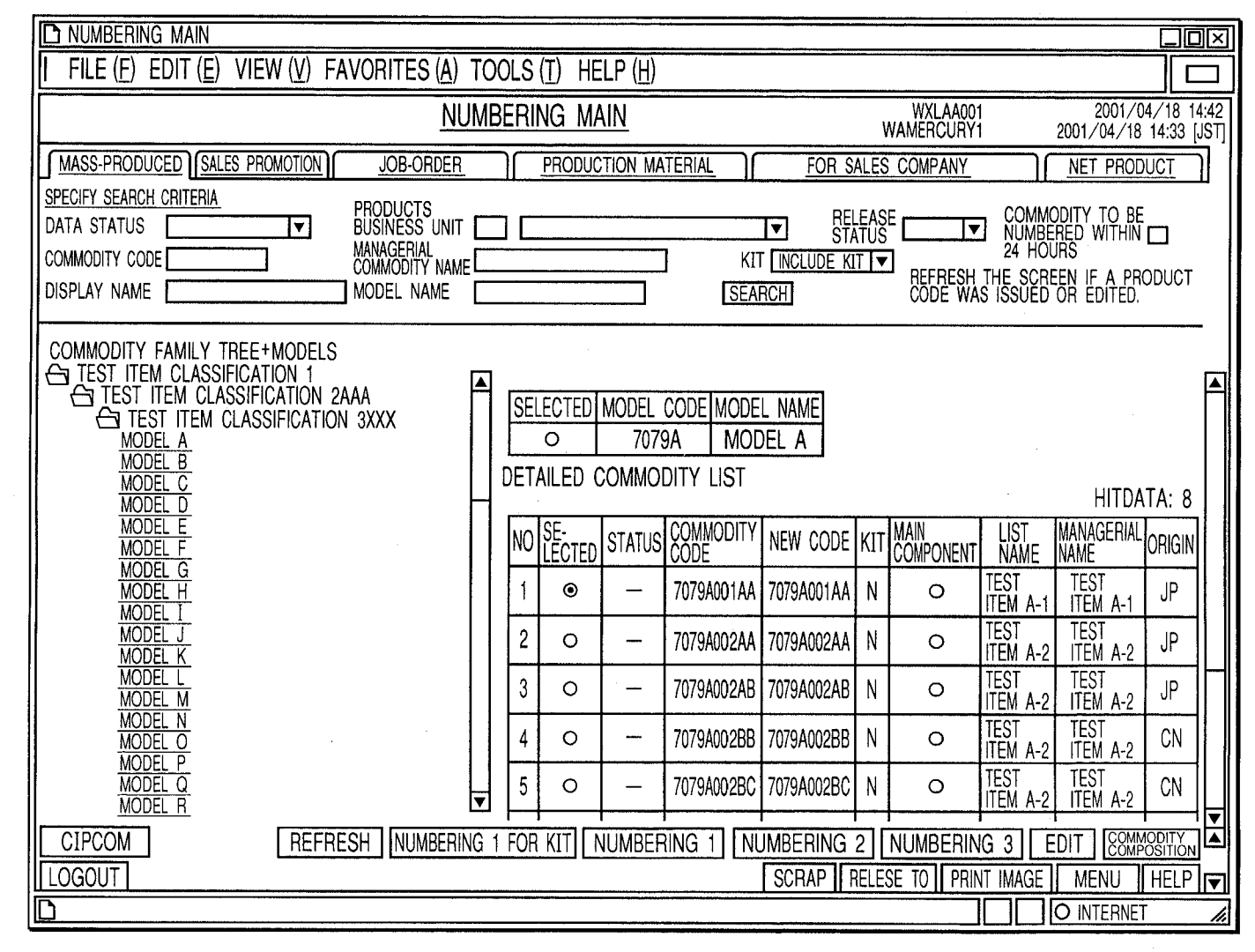

In FIG. 36 described above, as the user selects a desired commodity (FIG. 45) by turning on its commodity code radio button and clicks the "Third-level numbering" button, a data input screen such as the one shown in FIG. 46 appears.

Figure 47:
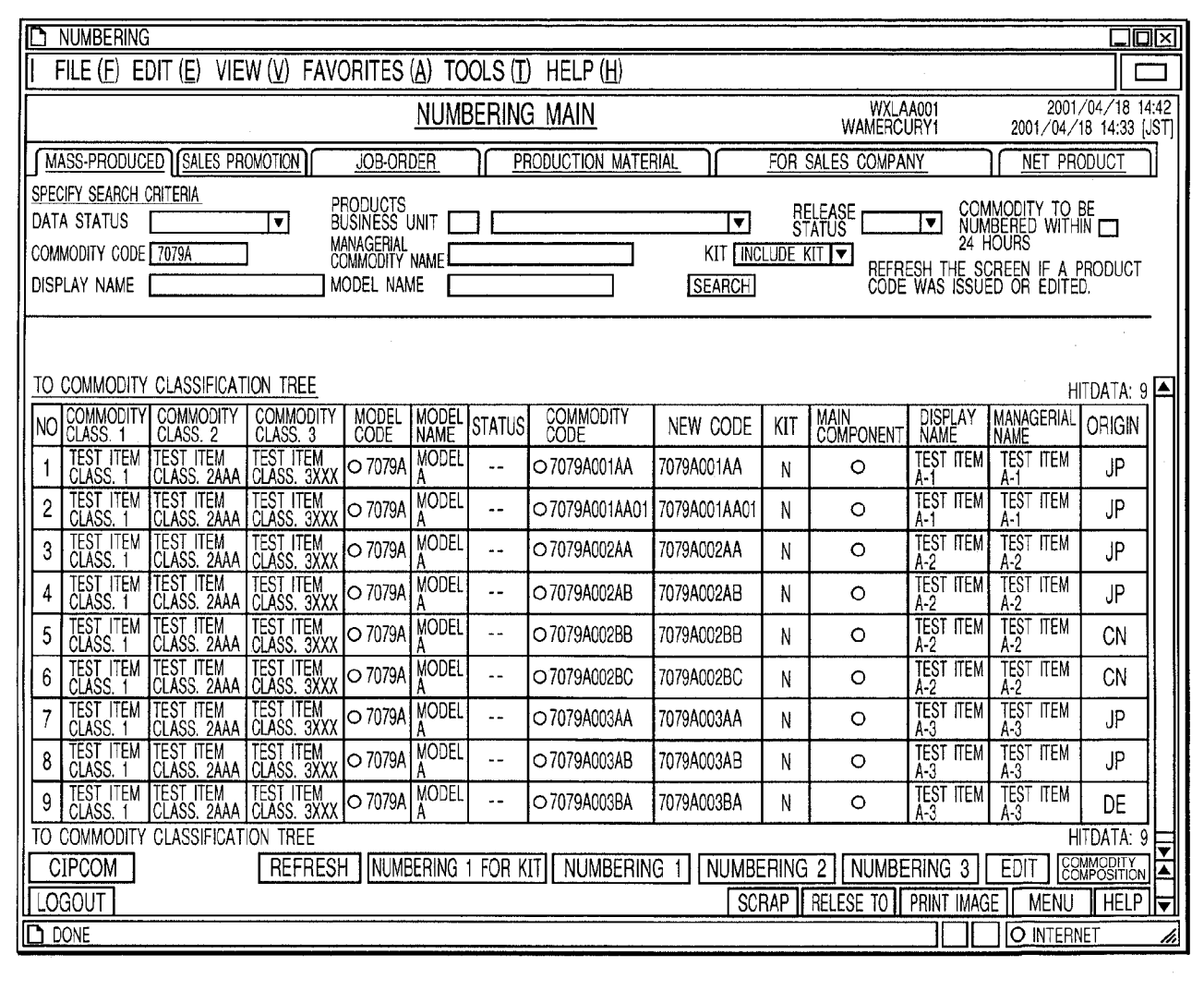

When the user fills in necessary fields and presses the "Register" button, registration is complete. By pressing the "Refresh" button in the "Numbering Main Screen," user can verify the results of the registration (FIG. 47).

(Entering a Commodity Composition Document)

Next, description will be given about how to enter a commodity composition document.

As the user selects "Issue Commodity Code" on the screen in FIG. 26, the same screen as that shown in FIG. 35 appears. When the user selects a model, a screen such as the one shown in FIG. 48 appears. As the user selects a desired commodity (turns on the radio button) and clicks the "Product Composition" button, a screen such as the one shown in FIG. 49 appears.

A commodity composition document can be created using one of the following three options.

(1) Create: Creates a entirely new commodity composition document.
(2) Link: Shares an existing commodity composition document.
(3) Copy: Copies the content of an existing commodity composition document.

Figure 49:
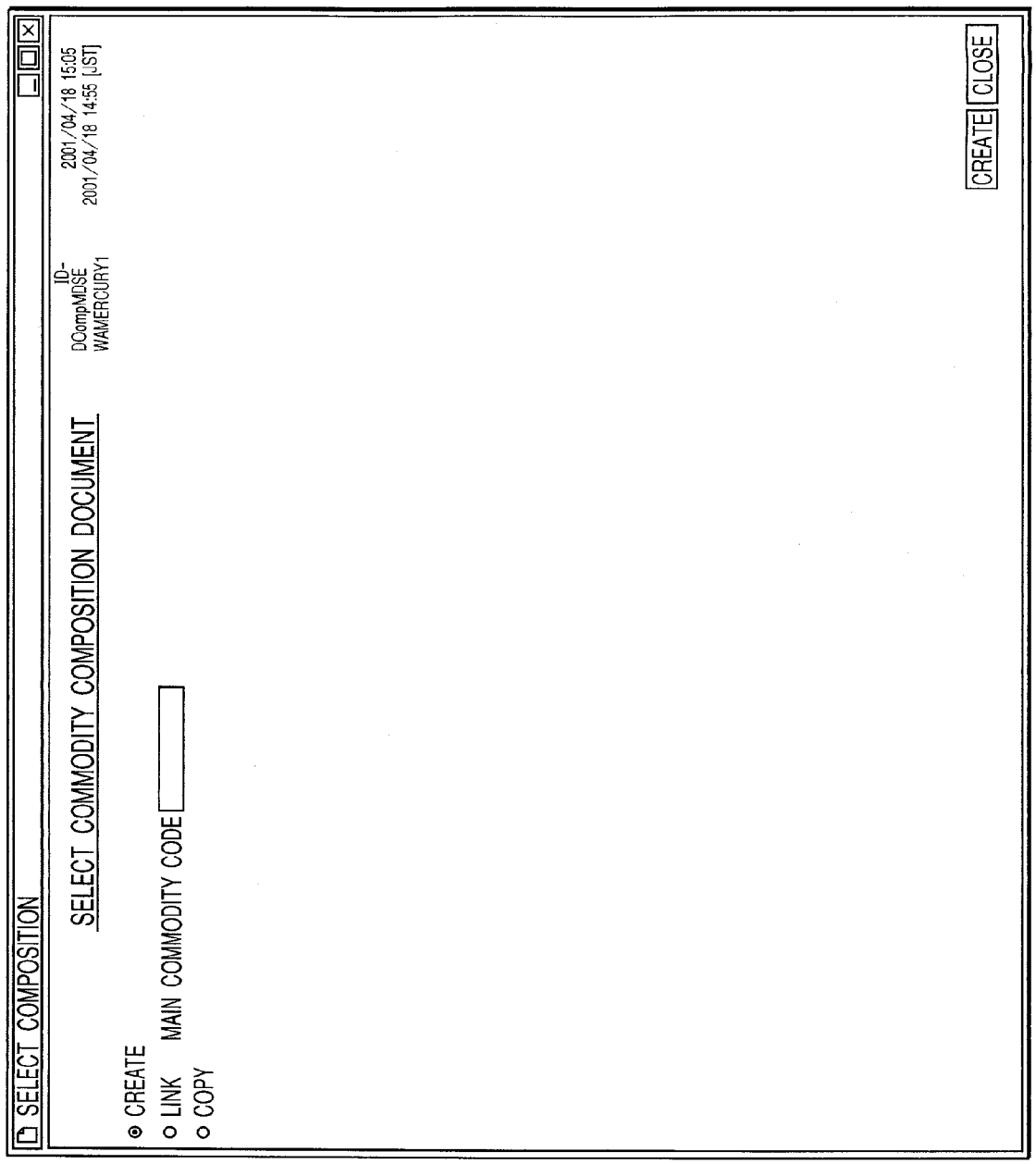
FIG. 49 is a diagram showing a screen displayed when registering a commodity composition document.

One of the three options should be selected from the screen in FIG. 49. To create a new commodity composition document, the user should click the "Create" button. To link or copy an existing commodity composition document, the user should enter a source commodity code (10 digits) and click the "Create" button. Then, a screen such as the one shown in FIG. 50 appears.

Nine display screens are provided to enter data for a commodity composition document. They correspond to a "Name tag," "Composition tag," "Control Items tag," "Package Labels tag," "Description tag," "Linked Commodities tag," "Release To tag," "Add Authorized Viewers tag," and "ITF tag."

a. Name Tag

As shown in FIG. 50, this tag displays, by default, entries of "Display Name," "JAN/EAN," "UPC," "Managerial Name," "Japanese Name," and "English Name" registered at the time of numbering.

b. Composition Tag

Figure 51:
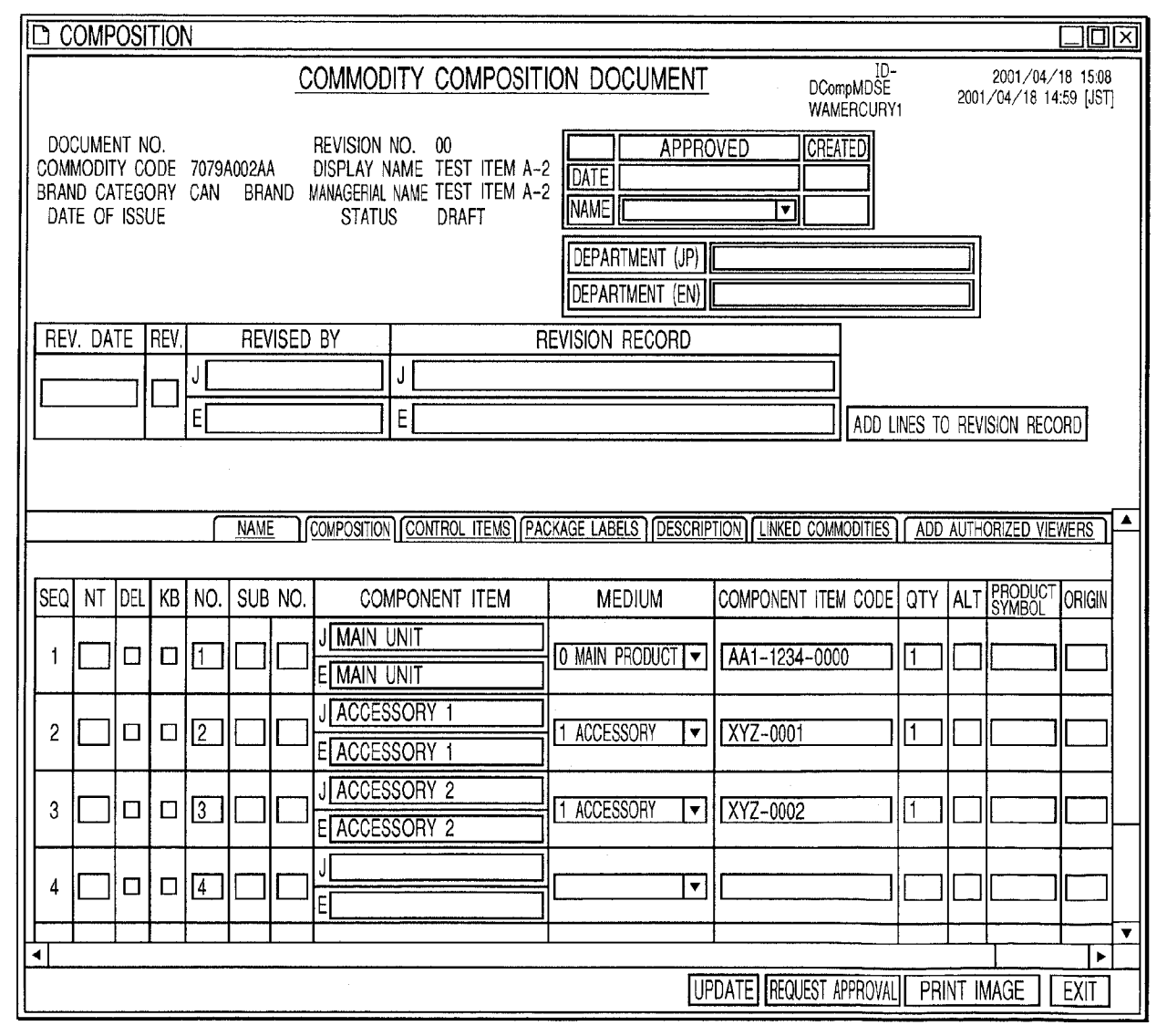

As shown in FIG. 51, ten input lines are displayed by default. To add lines, the user should click "Add Line." Up to 90 lines can be added. Regarding component items, at least one line must be filled in.

The following input fields are available.

(1) Nt (note): Checked when revising a commodity composition document once released.

(2) Del (delete): Checked when deleting a line.

(3) KB (killer bars): Checked when drawing killer bars while leaving a line as it is.

(4) Sub No.: Specified when a sub-number is used within the same line.

(5) Component Item: Accepts up to 30 Japanese characters or 60 alphabetical characters (required field).

(6) Component Item Code: Accepts up to 20 alphanumeric characters.

(7) Medium (order category): Allows classification of component items (1: Medium Order; 2: Indirect Materials).

(8) Qty (quantity): Three numeric digits (required field).

(9) Alt (alternative): Allows "Y" to be specified if the component item code is an alternative.

(10) Product Symbol: Allows a product symbol to be specified.

(11) Origin (country of origin): Allows the country of origin of the component item to be specified.

(12) Single Item: Allows "Y" to be specified if the component item can be sold separately as a single item.

(13) Installed: Allows "Y" to be specified if the component item has been installed in the main unit.

c. Control Items Tag

Figure 52:
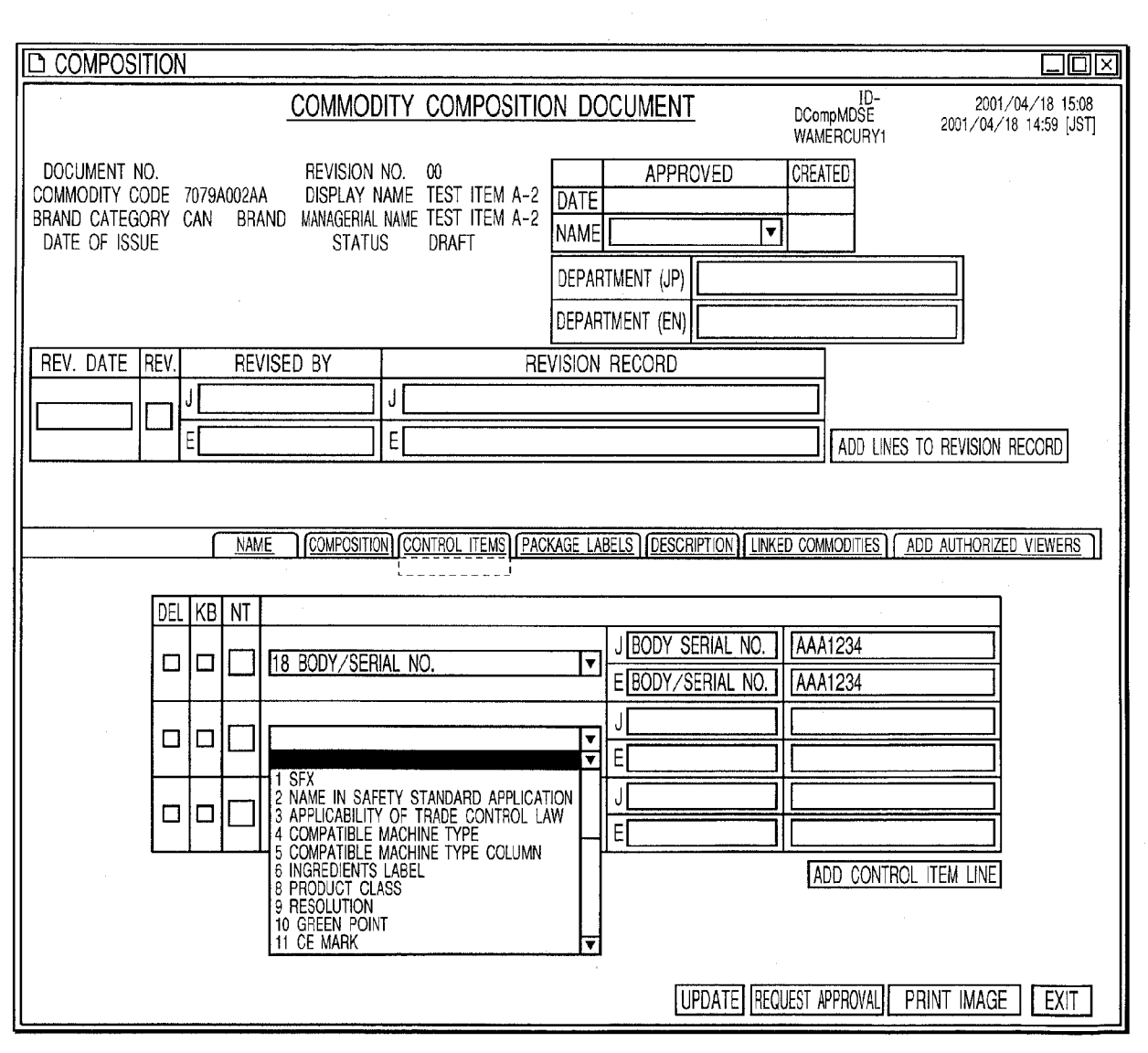

As shown in FIG. 52, items available as control items are displayed in a pull-down list. When the user selects an item, its title is displayed. Then, the user should enter an appropriate value. Up to 40 Japanese characters or 80 alphabetical characters are accepted. The title can be overwritten. Up to 10 Japanese characters or 20 alphabetical characters are accepted.

d. Package Labels Tag

Figure 53:
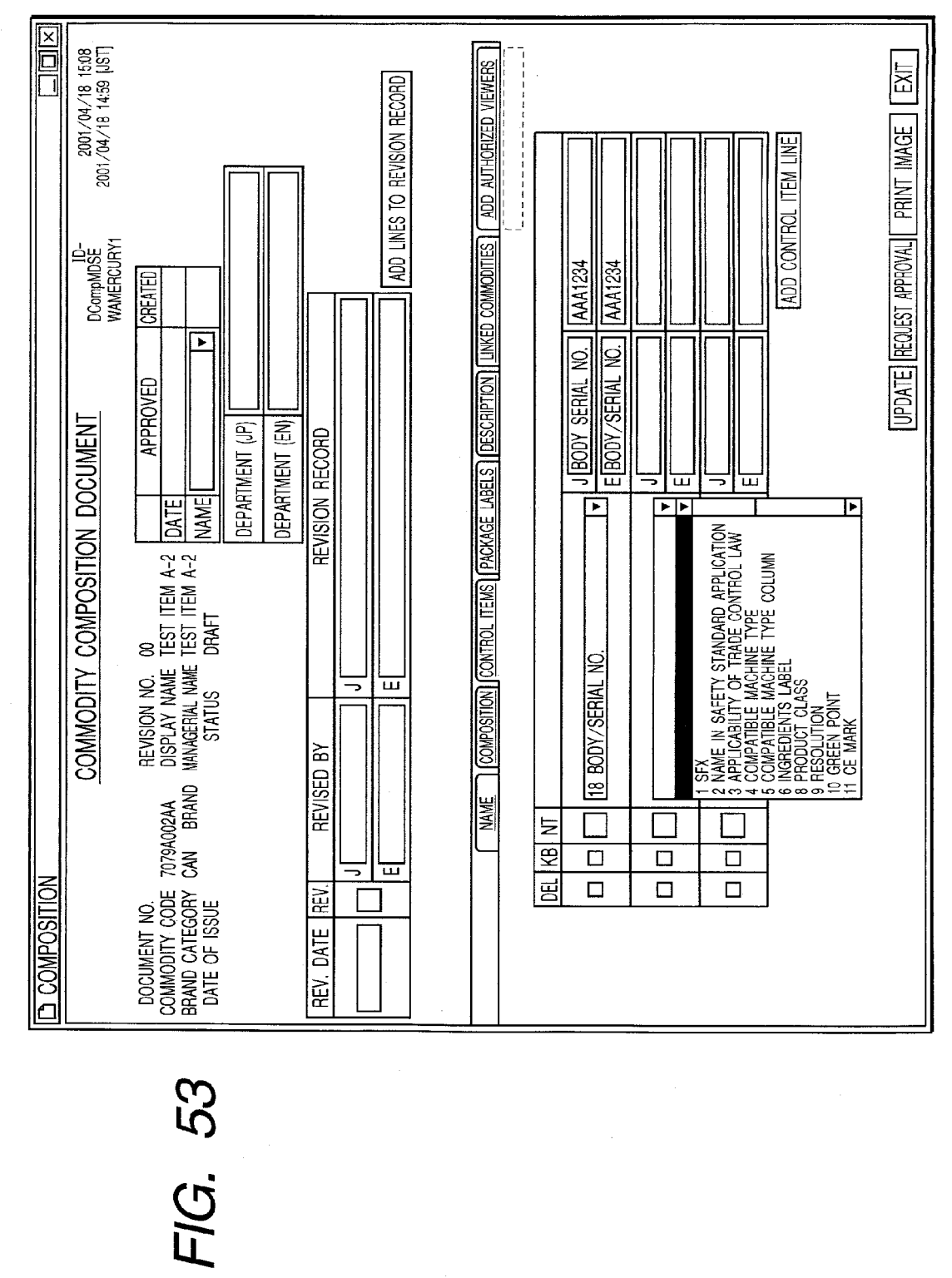

As shown in FIG. 53, Package Labels fields appear, allowing the user to describe instructions for a package label using up to 50 Japanese characters or 100 alphabetical characters.

e. Description Tag

Figure 54:
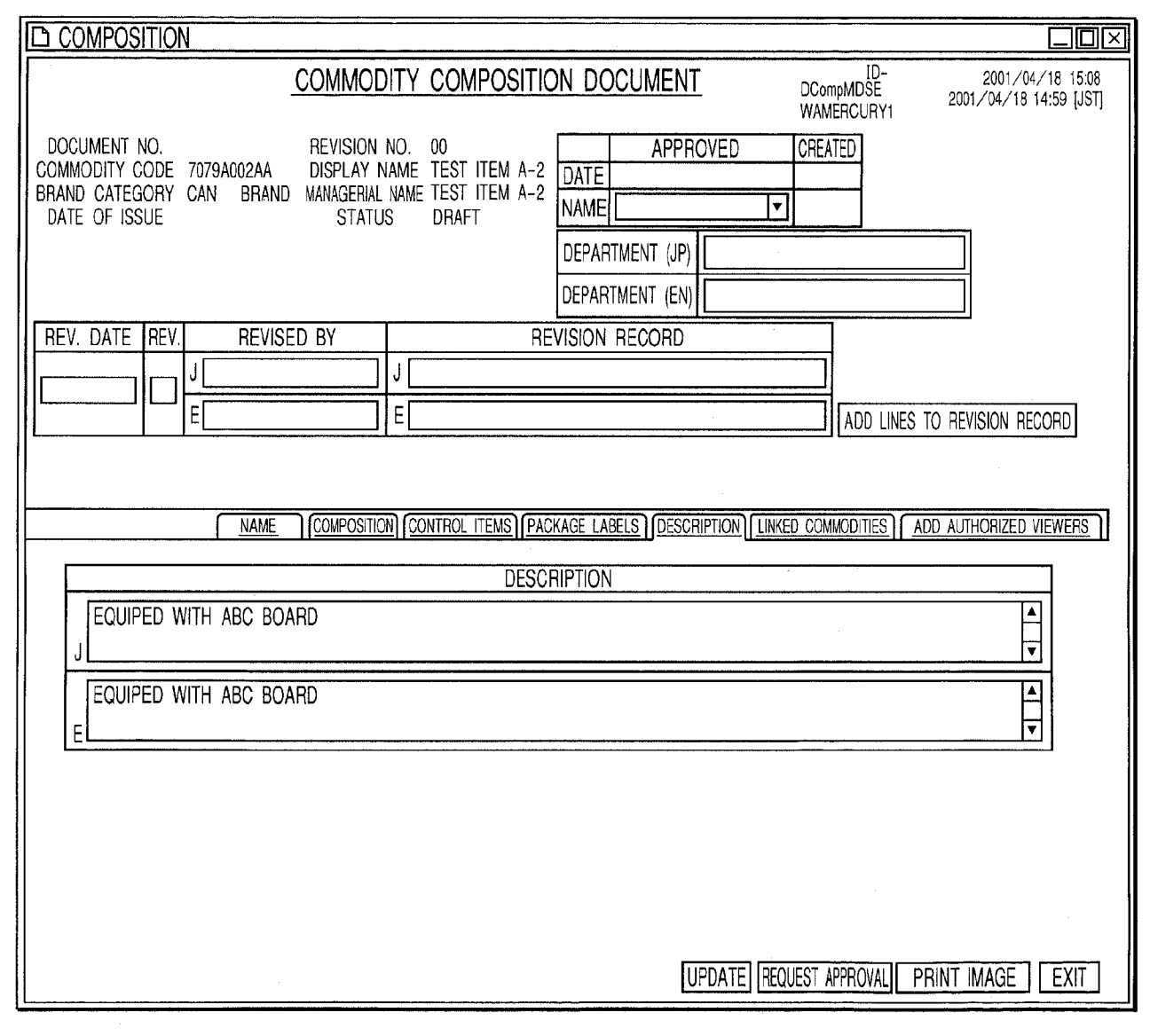

As shown in FIG. 54, Description fields appear, allowing the user to enter description using up to 150 Japanese characters or 300 alphabetical characters.

f. Linked Commodities Tag

Figure 55:
FIG. 55 is a diagram showing a screen displayed when registering a commodity composition document.

As shown in FIG. 55, a list of commodity codes which use the commodity composition document is displayed. This list is empty when the composition document is registered initially.

g. Release To Tag

As shown in FIG. 56, Release To fields are displayed, allowing the user to specify companies (bases) to which the commodity composition document is to be released. From region-specific pull-down lists under a company list, the user selects companies (bases) to which the commodity composition document is to be released. The selected companies are added to a Release To list. Before selecting companies from pull-down lists, the user should add lines to the Release To list by clicking the "Add Company" button.

h. Add Authorized Viewers Tag

Figure 57:
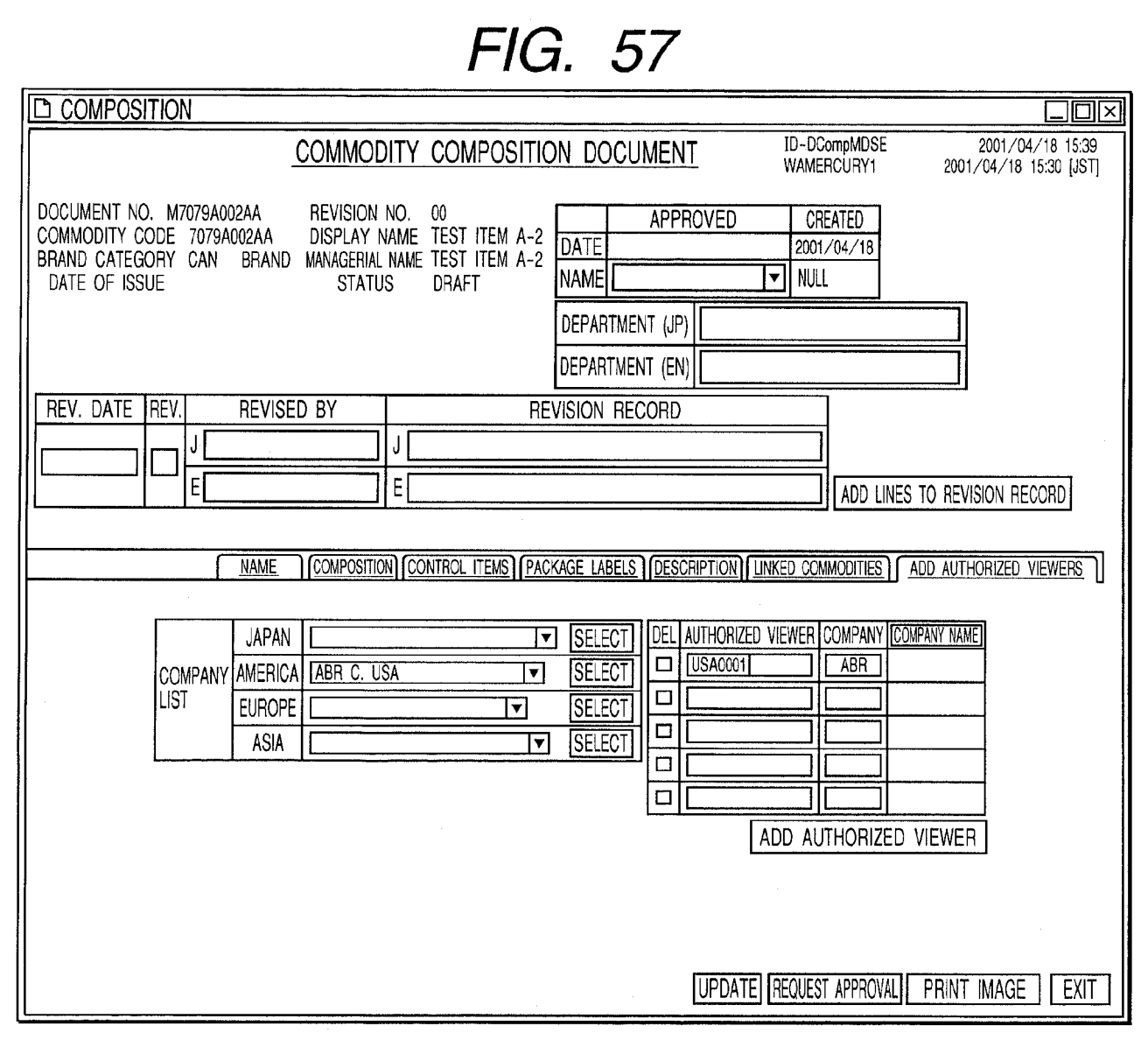

As shown in FIG. 57, Add Authorized Viewers fields appear, making it possible to specify IDs and companies of specific users to whom it is desired to disclose the commodity composition document. If no ID or company is specified, the commodity composition document is disclosed to the users who belong to the companies (bases) specified through the Release To tag.

i. ITF (ITF-14, SCC-14) Tag

Figure 58:
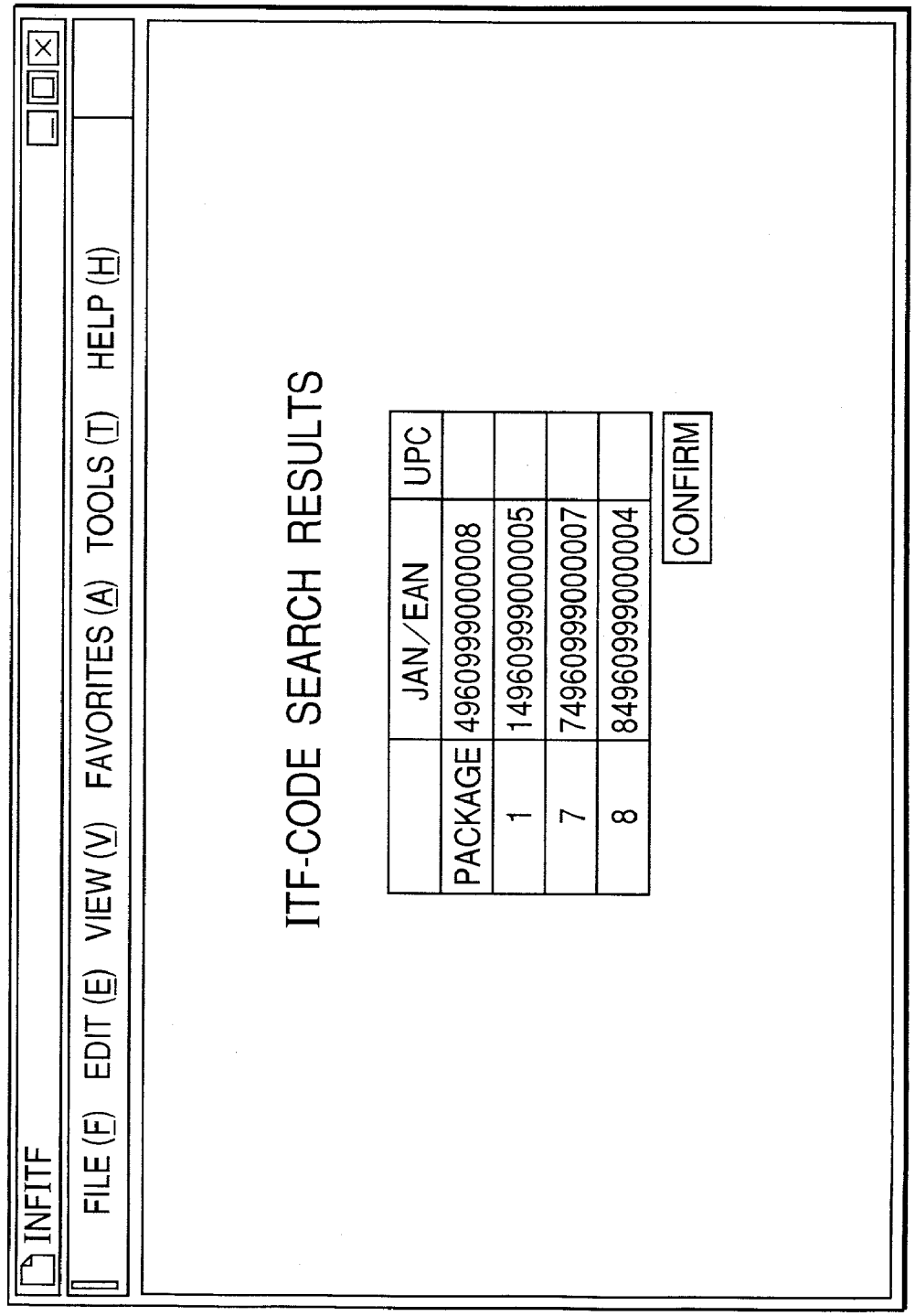
FIG. 58 is a diagram showing a screen displayed when registering a commodity composition document.

As shown in FIG. 58, ITF codes are displayed for commodities compliant with JAN, EAN, or UPS.

(Registering a Commodity Composition Document)

As the user fills in the fields on the screens specified by tags a to i (Name tag to ITF tag) described above and clicks the "Update" button, the commodity composition document is registered.

Figure 59:
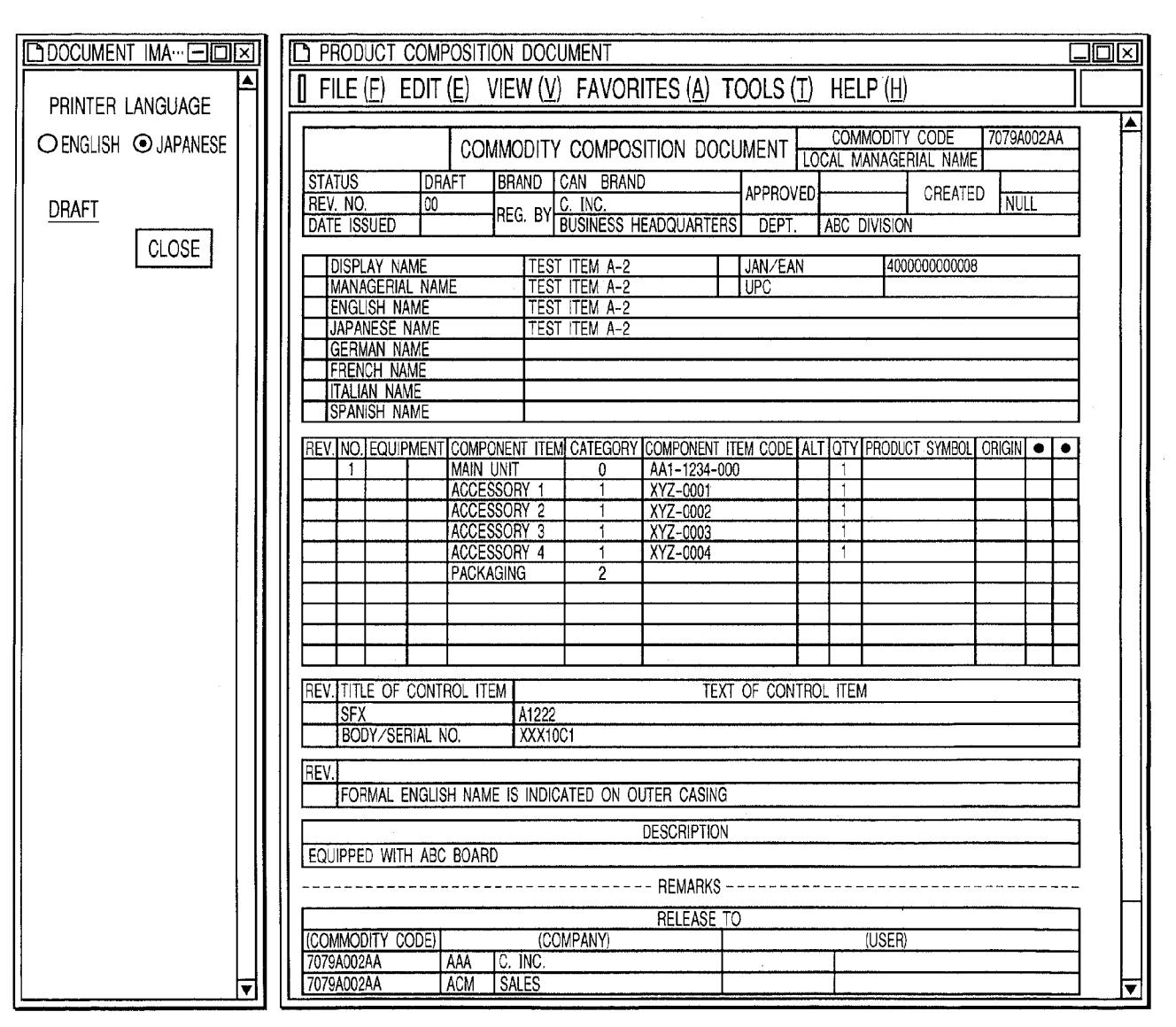

The user can check registration data through printout (or print preview) by selecting a commodity from Detailed Commodity List and clicking the "Print" button on Composition Document Input screen (FIG. 48). An example of print preview is shown in FIG. 59.

As described above, this embodiment makes it possible to manage commodities efficiently by unifying and maintaining commodity codes.

Also, it makes it possible to issue unified commodity codes efficiently.

Furthermore, it makes it possible to reference commodity codes efficiently.

Thus, the present invention makes it possible to manage commodities efficiently by unifying commodity codes.

What is claimed is:

1. A code management apparatus comprising:
    associating means for associating a commodity group with model names placed below the commodity group;
    numbering means for issuing a commodity code to be assigned to said model name, each said commodity code issued by said numbering means having plural levels at least including a first level of displaying information for a detailed commodity registered by an operator having a first access right, and a second level of displaying information concerning management of the commodity registered by an operator having a second access right, the first and second levels being respectively different classes, and the class of the second level being positioned below the class of the first level;
    a managing unit for acknowledging, by an operator having a third access right, publication of the commodity code; and
    a security managing unit for managing the first, second and third access rights.

2. A code management apparatus according to claim 1, wherein said numbering means can independently issue the commodity code with respect to each of the plural levels.

3. A code management apparatus according to claim 1, wherein said code management apparatus further has plural operation functions, and the information concerning the management of the commodity is information concerning an access right to the operation function.

4. A code management method comprising:

an associating step of associating a commodity group with model names placed below the commodity group;

a numbering step of issuing a commodity code to be assigned to each said model name, said commodity code issued by said numbering step having plural levels at least including a first level and a second level, the first and second levels being respectively different classes, and the class of the second level being positioned below the class of the first level, wherein said numbering step includes a step of registering a first level of displaying information for a detailed commodity by an operator having a first access right and a step of registering a second level of displaying information concerning management of said commodity registered by an operator having a second access right;

an acknowledgment step of acknowledging, by an operator having a third access right, publication of the commodity code; and a step of giving the first, second and third access rights to said respective operators.

5. A code management method according to claim 4, wherein said numbering step can independently issue the commodity code with respect to each of the plural levels.

6. A code management method according to claim 4, wherein said code management method further has plural operation functions, and the information concerning the management of the commodity is information concerning an access right to the operation function.

* * * * *